(12) United States Patent
Oh et al.

(10) Patent No.: US 10,980,007 B2
(45) Date of Patent: Apr. 13, 2021

(54) UPLINK RESOURCE CONFIGURATION METHOD AND APPARATUS IN WIRELESS COMMUNICATION SYSTEM

(71) Applicant: Samsung Electronics Co., Ltd., Gyeonggi-do (KR)

(72) Inventors: Jinyoung Oh, Seoul (KR); Youngbum Kim, Seoul (KR); Taehyoung Kim, Seoul (KR); Sungjin Park, Incheon (KR); Jeongho Yeo, Gyeonggi-do (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/146,453

(22) Filed: Sep. 28, 2018

(65) Prior Publication Data
US 2019/0104516 A1   Apr. 4, 2019

(30) Foreign Application Priority Data

Sep. 29, 2017 (KR) .................. 10-2017-0127698
Nov. 17, 2017 (KR) .................. 10-2017-0154035

(51) Int. Cl.
*H04W 72/04* (2009.01)
*H04L 5/00* (2006.01)

(52) U.S. Cl.
CPC .......... *H04W 72/0413* (2013.01); *H04L 5/00* (2013.01); *H04L 5/0053* (2013.01);
(Continued)

(58) Field of Classification Search
CPC .......... H04W 72/042; H04W 72/0453; H04W 72/0446; H04W 72/14; H04W 72/1289; H04W 72/0413
See application file for complete search history.

(56) References Cited

U.S. PATENT DOCUMENTS

2018/0279262 A1* 9/2018 Babaei ............... H04W 72/04
2019/0036673 A1* 1/2019 Chen ............... H04L 1/1657
(Continued)

OTHER PUBLICATIONS

MediaTek Inc., Summary of Offline Discussion on Bandwidth Part Operation, R1-1716832, 3GPP TSG RAN WG1 Meeting NR#3, Sep. 18-21, 2017, 7 pages.
(Continued)

*Primary Examiner* — Asad M Nawaz
*Assistant Examiner* — Najeeb Ansari
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for transmitting uplink control information in a wireless communication system is provided. The method includes receiving configuration information on a plurality of bandwidth parts (BWPs) from a base station; receiving downlink control information and downlink data from the base station; receiving BWP adaptation information which indicates a change of an active BWP from the base station; identifying an uplink control channel resource for transmitting acknowledgement information in response to the downlink data; and transmitting the acknowledgement information on the identified uplink control channel resource to the base station.

12 Claims, 14 Drawing Sheets

(52) U.S. Cl.
CPC .......... *H04L 5/0091* (2013.01); *H04L 5/0007* (2013.01); *H04L 5/0051* (2013.01); *H04W 72/042* (2013.01); *H04W 72/0453* (2013.01)

(56) References Cited

U.S. PATENT DOCUMENTS

| | | | |
|---|---|---|---|
| 2019/0044689 A1* | 2/2019 | Yiu | H04L 5/0098 |
| 2019/0059112 A1* | 2/2019 | Ou | H04W 74/0833 |
| 2019/0074886 A1* | 3/2019 | Yoon | H04B 17/318 |
| 2019/0090299 A1* | 3/2019 | Ang | H04L 5/001 |
| 2019/0140776 A1* | 5/2019 | Seo | H04L 1/0071 |
| 2019/0199592 A1* | 6/2019 | Lin | H04L 5/0091 |
| 2019/0230685 A1* | 7/2019 | Park | H04L 5/00 |
| 2019/0245648 A1* | 8/2019 | Jo | H04L 1/0026 |
| 2019/0260530 A1* | 8/2019 | Yi | H04L 5/001 |
| 2020/0059345 A1* | 2/2020 | Pelletier | H04L 1/1657 |
| 2020/0077432 A1* | 3/2020 | Xiong | H04L 1/1825 |
| 2020/0120650 A1* | 4/2020 | Yi | H04W 72/085 |
| 2020/0163085 A1* | 5/2020 | Takeda | H04W 28/26 |
| 2020/0213065 A1* | 7/2020 | Takeda | H04W 72/04 |
| 2020/0252180 A1* | 8/2020 | Takeda | H04W 72/04 |
| 2020/0274750 A1* | 8/2020 | Yi | H04L 27/2613 |

OTHER PUBLICATIONS

Panasonic, "Discussion on Resource Allocation for Uplink Control Channel", R1-1716124, 3GPP TSG RAN WG1 Meeting NR-AH#3, Sep. 18-21, 2017, 3 pages.
LG Electronics, "Discussion on Carrier Aggregation and Bandwidth Parts", R1-1715892, 3GPP TSG RAN WG1 Meeting NR#3, Sep. 18-21, 2017, 12 pages.
Nokia, Nokia Shanghai Bell, "On the Remaining Wider-Band Aspects of NR", R1-1714094, 3GPP TSG-RAN WG1 Meeting #90, Aug. 21-25, 2017, 6 pages.
Huawei, HiSilicon, "Resource Allocation and Transmit Diversity for PUCCH", R1-1715405, 3GPP TSG RAN WG1 Meeting AH_NR#3, Sep. 18-21, 2017.
International Search Report dated Jan. 10, 2019 issued in counterpart application No. PCT/KR2018/011501, 3 pages.

* cited by examiner

UPLINK RESOURCE CONFIGURATION METHOD AND APPARATUS IN WIRELESS COMMUNICATION SYSTEM

CROSS-REFERENCE TO RELATED APPLICATION(S)

This application is based on and claims priority under 35 U.S.C. § 119 to Korean Patent Application No. 10-2017-0127698, filed on Sep. 29, 2017, in the Korean Intellectual Property Office, and Korean Patent Application No. 10-2017-0154035, filed on Nov. 17, 2017, in the Korean Intellectual Property Office, the disclosures of which are incorporated by reference herein in their entirety.

BACKGROUND

1. Field

The present disclosure relates generally to a wireless communication system and, more particularly, to a method and apparatus for configuring uplink control channel transmission resources in a next-generation mobile communication system.

2. Description of Related Art

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to Iot networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the Iot technology.

Unlike legacy communication systems, the next generation mobile communication system (hereinafter, interchangeably referred to as the 5G system) that has been under development recently requires flexibility in time and frequency resource utilization. In particular, it is important to secure flexibility in control channel design.

SUMMARY

The present disclosure has been made to address the above-mentioned problems and disadvantages, and to provide at least the advantages described below.

In accordance with an aspect of the present disclosure, a method for transmitting uplink control information in a wireless communication system is provided. The method includes receiving configuration information on a plurality of bandwidth parts (BWPs) from a base station; receiving downlink control information and downlink data from the base station; receiving BWP adaptation information which indicates a change of an active BWP from the base station; identifying an uplink control channel resource for transmitting acknowledgement information in response to the downlink data; and transmitting the acknowledgement information on the identified uplink control channel resource to the base station.

In accordance with another aspect of the present disclosure, a method for receiving uplink control information in a wireless communication system is provided, the method includes transmitting configuration information on a plurality of BWPs to a terminal; transmitting downlink control information and downlink data to the terminal; transmitting BWP adaptation information which indicates a change of an active BWP to the terminal; identifying an uplink control channel resource for receiving acknowledgement information in response to the downlink data; and receiving the acknowledgement information on the identified uplink control channel resource from the terminal.

In accordance with another aspect of the present disclosure, a terminal for transmitting uplink control information in a wireless communication system is provided. The terminal includes a transceiver and a controller coupled with the transceiver. The controller is configured to receive configuration information on a plurality of BWPs from a base station, receive downlink control information and downlink data from the base station, receive BWP adaptation information which indicates a change of an active BWP from the base station, identify an uplink control channel resource for transmitting acknowledgement information in response to the downlink data, and transmit the acknowledgement information on the identified uplink control channel resource to the base station.

In accordance with another aspect of the present disclosure, a base station for receiving uplink control information in a wireless communication system is provided. The base station includes a transceiver and a controller coupled with the transceiver. The controller is configured to transmit configuration information on a plurality of BWPs to a terminal, transmit downlink control information and downlink data to the terminal, transmit BWP adaptation information which indicates a change of an active BWP to the terminal, identify an uplink control channel resource for receiving acknowledgement information in response to the downlink data, and receive the acknowledgement information on the identified uplink control channel resource from the terminal.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
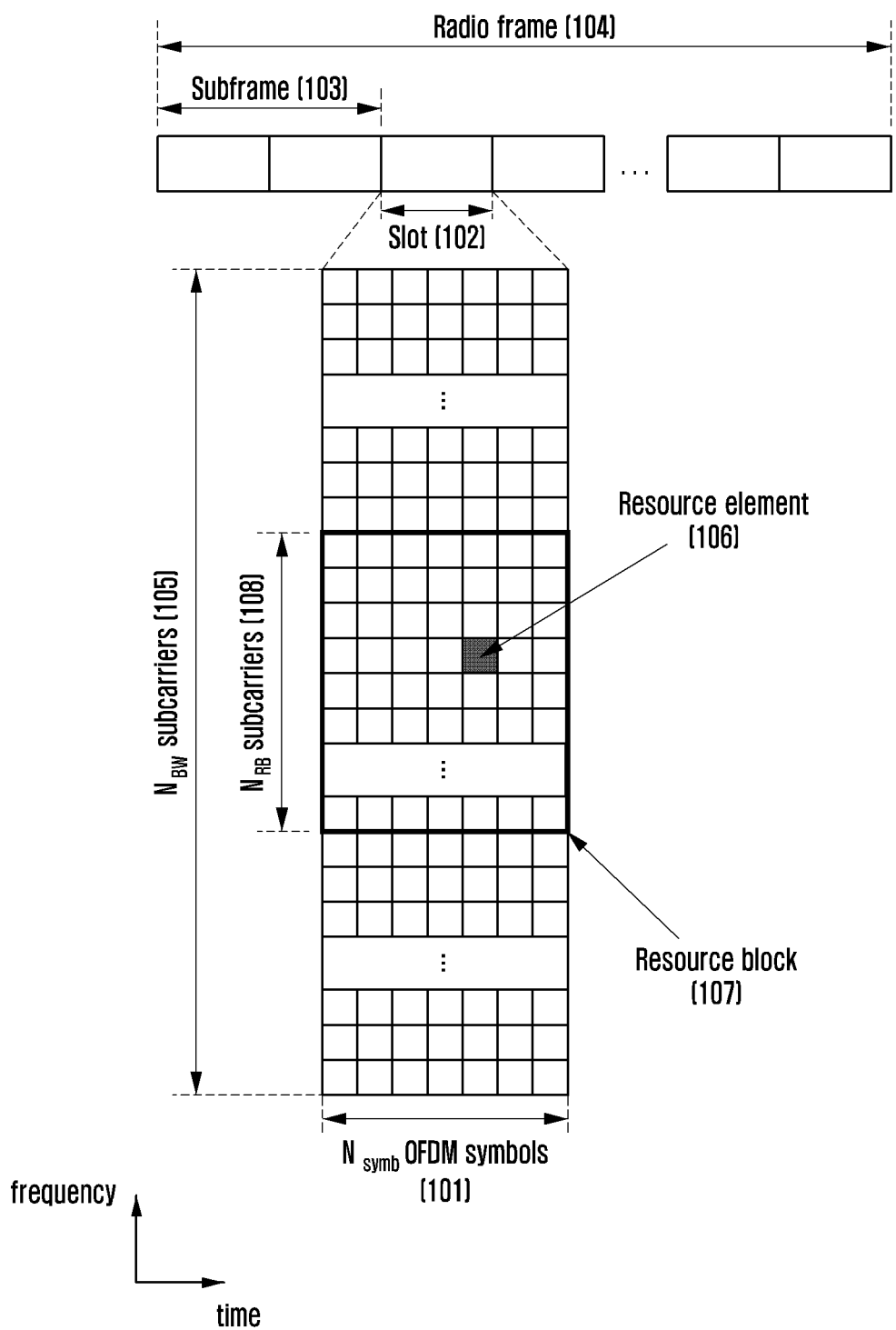
FIG. 1 is a diagram illustrating a basic time-frequency resource structure for transmitting downlink data and control channels in an LTE system.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made.

Detailed descriptions of technical specifications well-known in the art and unrelated directly to the present disclosure are omitted to avoid obscuring the subject matter of the present disclosure. Unnecessary descriptions are omitted so as to make clear the subject matter of the present disclosure.

For the above reason, some elements are exaggerated, omitted, or simplified in the accompanying drawings and, in practice, the elements may have different sizes and/or shapes from those shown in the accompanying drawings. Throughout the drawings, the same or equivalent parts are indicated by the same reference numbers.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, the embodiments are provided so that the present disclosure is thorough and complete and fully conveys the concept of the disclosure to those skilled in the art, and the present disclosure is only defined by the appended claims and their equivalents. Like reference number refer to like elements throughout the present disclosure.

It will be understood that each block of the flowcharts and/or block diagrams, and combinations of blocks in the flowcharts and/or block diagrams, may be implemented by computer program instructions. These computer program instructions may be provided to a processor of a general-purpose computer, a special purpose computer, or another programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing certain logic function(s). Moreover, it should be noted that the functions of the blocks may be performed in a different order in several modifications. For example, two successive blocks may be performed substantially at the same time, or may be performed in reverse order according to their functions.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, a module may include, for example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more central processing units (CPUs) in a device or a secure multimedia card.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present description is directed to LTE and 5G systems, it is understood by those skilled in the art that the present disclosure can be applied to other communication systems having a similar technical background and channel format with a slight modification, without departing from the spirit and scope of the present disclosure.

The mobile communication system has evolved to a high-speed, high-quality packet data communication system (such as high speed packet access (HSPA), LTE (or evolved universal terrestrial radio access (E-UTRA)), and LTE-advanced (LTE-A) defined in the $3^{rd}$ Generation Partnership Project (3GPP); high rate packet data (HRPD) defined in the $3^{rd}$ Generation Partnership Project-2 (3GPP2); and Institute of Electrical and Electronics Engineers (IEEE) standard 802.16e) capable of providing data and multimedia services beyond the early voice-oriented services.

The LTE system, as one of the representative broadband wireless communication systems, uses orthogonal frequency division multiplexing (OFDM) in the downlink and single carrier frequency division multiple access (SC-FDMA) in the uplink. The term "uplink" (UL) denotes a radio transmission path from a terminal, which is interchangeably referred to as a UE and mobile station (MS), to a BS, which is interchangeably referred to as evolved node B (eNB). The term "downlink" (DL) denotes a radio transmission path from a BS to a terminal. Such multiple access schemes are characterized by allocating the time-frequency resources for transmitting user-specific data and control information without overlapping each other (i.e., maintaining orthogonality), so as to distinguish among user-specific data and control information.

As a next generation communication system after LTE, the 5G communication system should be designed to meet various requirements of services demanded by users and service providers. The services supported by the 5G system may be categorized into three categories: enhanced mobile broadband (eMBB), massive machine type communications (mMTC), and ultra-reliable and low-latency communications (URLLC).

The eMBB aims to provide exceptionally high data rates in comparison with those supported by the legacy LTE, LTE-A, and LTE-A Pro. For example, the eMBB aims to increase the peak data rate up to 20 Gbps in DL and 10 Gbps in UL per BS. Simultaneously, eMBB aims to increase the user-perceived data rate. In order to meet such requirements, it is necessary to improve signal transmission/reception technologies including the MIMO technique. The data rate requirements for the 5G communication system may be met by use of a frequency bandwidth broader than 20 MHz in the frequency band of 3 to 6 GHz or above 6 GHz instead of the current LTE band of 2 GHz.

In addition, the mMTC is considered to support application services for the Iot. In order to provide mMTC-based Iot application services effectively, it is necessary to secure massive access resources for terminals within a cell, improve terminal coverage and battery life, and reduce device manufacturing costs. The Iot services should be designed to support a large number of terminals (e.g., 1,000,000 terminals/$km^2$) within a cell in consideration of the nature of the Iot terminals that are attached to various sensors and devices for providing a communication function. By the nature of the Iot services, the mMTC terminals are likely to be located in coverage holes such as the basement of a building, which requires broader coverage in comparison with other services being supported in the 5G communication system. The mMTC terminals that are characterized by their low prices and battery replacement difficulty should be designed to have a very long battery lifetime.

Finally, URLLC is targeted for mission-critical cellular-based communication services such as remote robot and machinery control, industrial automation, unmanned aerial vehicle, remote health care, and emergency alert services that require ultra-low latency and ultra-high reliability. Accordingly, a URLLC service requires ultra-low latency and ultra-high reliability. For example, a URLLC service must meet the requirements of air-interface latency lower than 0.5 ms and a packet error rate less than or equal to $10^{-5}$. In this respect, in order to support the URLLC services, the 5G system must support transmit time intervals (TTI) shorter than those of other services and assign broad resources in the frequency band. Accordingly, the 5G system must support a short TTI for the URLLC, which is less than that for other services, and allocate broad resources in a frequency band to secure reliability of the communication link.

The three categories of service (i.e., eMBB, URLLC, and mMTC) may be multiplexed into one system. In order to meet the different service-specific requirements, the different categories of services may be transmitted/received with different transmission/reception schemes and parameters.

A description of the frame structure of the LTE and LTE-A systems hereinafter is provided with reference to the accompanying drawings.

FIG. 1 is a diagram illustrating a basic time-frequency resource structure for transmitting DL data and control channels in an LTE system.

Referring to FIG. 1, the horizontal axis denotes time, and the vertical axis denotes frequency. The smallest transmission unit in the time domain is an OFDM symbol, and $N_{symb}$ OFDM symbols 101 form a slot 102, and 2 slots form a subframe 103. Each slot spans 0.5 ms, and each subframe spans 1.0 ms. A radio frame 104 is a time unit consisting of 10 subframes. In the frequency domain, the smallest transmission unit is a subcarrier, and the total system transmission bandwidth consists of $N_{BW}$ subcarriers 105. In the time-frequency resource structure, the basic resource unit is a resource element (RE) 106 indicated by an OFDM symbol index and a subcarrier index. A resource block (RB) (or physical resource block (PRB)) 107 is defined by $N_{symb}$ consecutive OFDM symbols 101 in the time domain and $N_{RB}$ consecutive subcarriers 108 in the frequency domain. That is, one RB 107 consists of $N_{symb} \times N_{RB}$ REs 106. Typically, the RB is the smallest data transmission unit. In the LTE system, $N_{symb}=7$, $N_{RB}=12$, and $N_{BW}$ is proportional to the system transmission bandwidth.

Next, a description of the DCI for LTE and LTE-A systems is provided.

In the LTE system, the DL or UL data scheduling information is transmitted from an eNB to the UE using DCI. The DCI is categorized into different DCI formats depending on the purpose (e.g., indicating UL grant for UL data scheduling or DL grant for DL data scheduling, indicating usage for control information that is small in size, indicating whether multiple antenna-based spatial multiplexing is applied, and indicating usage for power control). For example, the DCI format 1 for a DL grant is configured to include at least the following information.

Resource allocation type 0/1 flag: Resource allocation type 0/1 flag indicates whether the resource allocation scheme is Type 0 or Type 1. Type-0 is used to allocate resources in units of RBG by applying a bitmap scheme. In the LTE system, the basic unit of scheduling may be an RB that is expressed by time-frequency domain resources, and the RBG may include multiple RBs and may be the basic unit of scheduling in the Type-0 scheme. Type-1 is used to allocate a particular RB in an RBG.

Resource block assignment: Resource block assignment indicates an RB allocated for data transmission. The resources may be determined depending on the system bandwidth and the resource allocation scheme.

Modulation and coding scheme (MCS): MCS indicates a modulation scheme used for data transmission and a size of a transport block to be transmitted.

Hybrid automatic repeat request (HARQ) process number: a HARQ process number indicates a process number of a HARQ.

New data indicator: New data indicator indicates whether the HARQ transmission is an initial transmission or a retransmission.

Redundancy version: a redundancy version indicates a redundancy version of a HARQ.

Transmit power control (TPC) command for PUCCH: TPC command for a PUCCH indicates a power control command for a PUCCH that is a UL control channel.

The DCI may be transmitted over a PDCCH or an EPDCCH after undergoing a channel coding and modulation process.

A cyclic redundancy check (CRC) is attached to a DCI message payload and is scrambled with a radio network temporary identifier (RNTI) of a UE. There are different types of RNTIs for the purposes of the DCI message, e.g., a UE-specific data transmission, a power control command, and a random access response. That is, the RNTI is not transmitted explicitly, but is included during the CRC calculation procedure. Upon receipt of a DCI message on the PDCCH, the UE performs a CRC check with an assigned RNTI and determines, if the CRC check succeeds, the message is addressed to itself.

Figure 2:
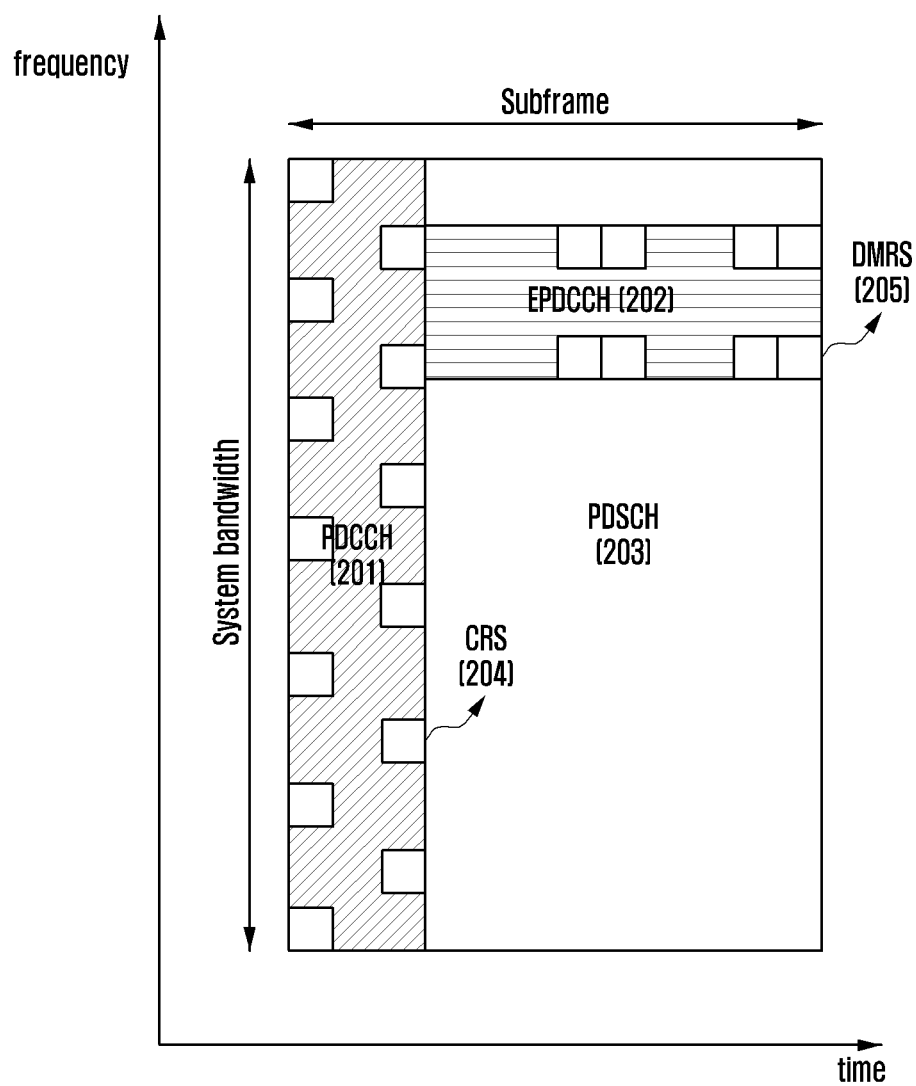
FIG. 2 is a diagram illustrating a physical downlink control channel (PDCCH) and an enhanced PDCCH (EPDCCH) as downlink physical channels carrying LTE downlink control information (DCI)

FIG. 2 is a diagram illustrating a PDCCH and an EPDCCH as DL physical channels carrying an LTE DCI.

Referring to FIG. 2, the PDCCH 201 is time-division-multiplexed (TDMed) with a physical downlink shared channel (PDSCH) 203 as a data channel and spread across the whole system bandwidth. The control region for transmitting the PDCCH 201 may be expressed by a number of OFDM symbols, which is indicated by a control format indicator (CFI) being transmitted in a physical control format indicator channel (PCFICH) to the UE. The PDCCH 201 is mapped to a few OFDM symbols at the beginning of a subframe such that the UE promptly decodes the DL scheduling information for use in decoding a DL shared channel (DL-SCH) without delay, resulting in a contribution to DL transmission delay reduction. Assuming that a PDCCH conveys one DCI message, it may occur that multiple UEs' PDCCHs are transmitted per cell when multiple UEs are scheduling in DL and UL.

As a reference signal for decoding PDCCH 201, a cell-specific reference signal (CRS) 204 is used. The CRS 204 is spread across the whole system bandwidth and transmitted in every subframe with different scrambling and resource mapping determined according to a cell identifier (ID). The CRS 204 cannot be beamformed in a UE-specific manner because it is a common reference signal used by all of the UEs located within the cell. Accordingly, the multiantenna transmission of LTE PDCCH is limited to the open-loop transmission diversity. The number of CRS ports is implicitly notified to the UE via physical broadcast channel (PBCH) decoding.

Resource allocation for PDCCH 201 is performed based on a control-channel element (CCE), and one CCE consists of 9 resource element groups (REGs) (i.e. 36 resource elements (REs). The PDCCH 201 may be transmitted on 1, 2, 4, or 8 CCEs), and the number of CCEs is determined depending on a channel coding rate of the DCI message payload. The reason for using a different numbers of CCEs is to achieve link adaptation of the PDCCH 201.

A UE must detect the PDCCH 201 without information thereon through blind decoding within a search space, which is a set of CCEs. The search space is a group of CCEs composed of an aggregation level (AL), which is implicitly determined based on a function of the UE identity and a subframe number rather than explicitly signaled. The UE performs blind decoding of all possible resource candidates available with the CCEs within the search space to decode the PDCCH 201 and process the information verified as valid for the UE through a CRC test.

There are two types of search spaces: the UE-specific search space and the common search space. A group of UEs or all of the UEs may monitor the common search space of the PDCCH 201 to receive cell-specific control information such as dynamic scheduling for system information and paging messages. For example, it may be possible to receive DL-SCH scheduling assignment information for transmitting system information block-1 (SIB-1) including operator information of the cell by decoding the common search space of the PDCCH 201.

As shown in FIG. 2, an EPDCCH 202 is multiplexed with a PDSCH 203 in frequency. The eNB may allocate resources for the EPDCCH 202 and the PDSCH 203 appropriately through scheduling to effectively support coexistence with the data transmission to the legacy LTE UE. However, a problem arises in that the EPDCCH 202 spanning one subframe contributes to the transmission delay.

Multiple EPDCCHs 202 may constitute an EPDCCH set for which resources are allocated by a PRB pair. The EPDCCH set location is configured in a UE-specific manner, and the EPDCCH set location information is transmitted via radio resource control (RRC) signaling. A UE may be assigned up to two EPDCCH sets, and one EPDCCH set may be multiplexed with those of other UEs.

The resource allocation for EPDCCH 202 is performed based on enhanced CCE (ECCE), where one ECCE consisting of 4 or 8 enhanced REGs (EREGs), and the number of EREGs per ECCE is determined depending on the cyclic prefix (CP) length and subframe configuration information. One EREG consists of 9 REs, and there may be up to 16 EREGs per PRB pair. There are two different ways of transmitting the EPDCCHs 202 according to the mapping scheme of EREGs to REs: "localized" and "distributed". There are 6 possible ECCE aggregation levels of 1, 2, 4, 8, 16, and 32 of which one is selected based on the CP length, subframe configuration, EPDCCH format, and transmission scheme.

The EPDCCH 202 is transmitted only in the UE-specific search space. Accordingly, the UE has to monitor the common search spaces for the PDCCH 201 to receive the system information.

The EPDCCH 202 carries a demodulation reference signal (DMRS) 205. The eNB may perform precoding on the EPDCCH 202 and use UE-specific beamforming. Without notice of the precoding in use for the EPDCCH 202, the UEs may decode the EPDCCH 202. The EPDCCH 202 is configured with the same DMRS pattern used for the PDSCH 203. However, the DMRS 205 may support up to 4 antenna ports in the EPDCCH 202, unlike in the PDSCH 203. The DMRS 205 may be transmitted only in the PRB to which the EPDCCH 202 is mapped.

The port configuration information of the DMRS 205 differs depending on the EPDCCH transmission mode. In the localized transmission mode, the antenna ports corresponding to the ECCEs to which the EPDCCH 202 is mapped are selected based on the UE ID. In the case where the same ECCEs are shared by multiple UEs (i.e., multiuser MIMO is used for transmission), the DMRS antenna ports may be assigned respective UEs. The DMRS 205 may also be transmitted in a shared manner and, in this case, it is possible to distinguish the UEs using DMRS scrambling sequences configured through high layer signaling. In the distributed transmission mode, it is possible to support up to two antenna ports for the DMRS 205 and a precoder cycling-based diversity scheme. The DMRS 205 mapped to the REs within the same PRB pair may be shared.

Hereinabove, a description has been made of the DL control channel transmission method and the RS for use in decoding the DL control channel in the legacy LTE and LTE-A.

Hereinafter, a description is made of the DL control channels that are under discussion currently for use in 5G communication with reference to the accompanying drawings.

Figure 3:
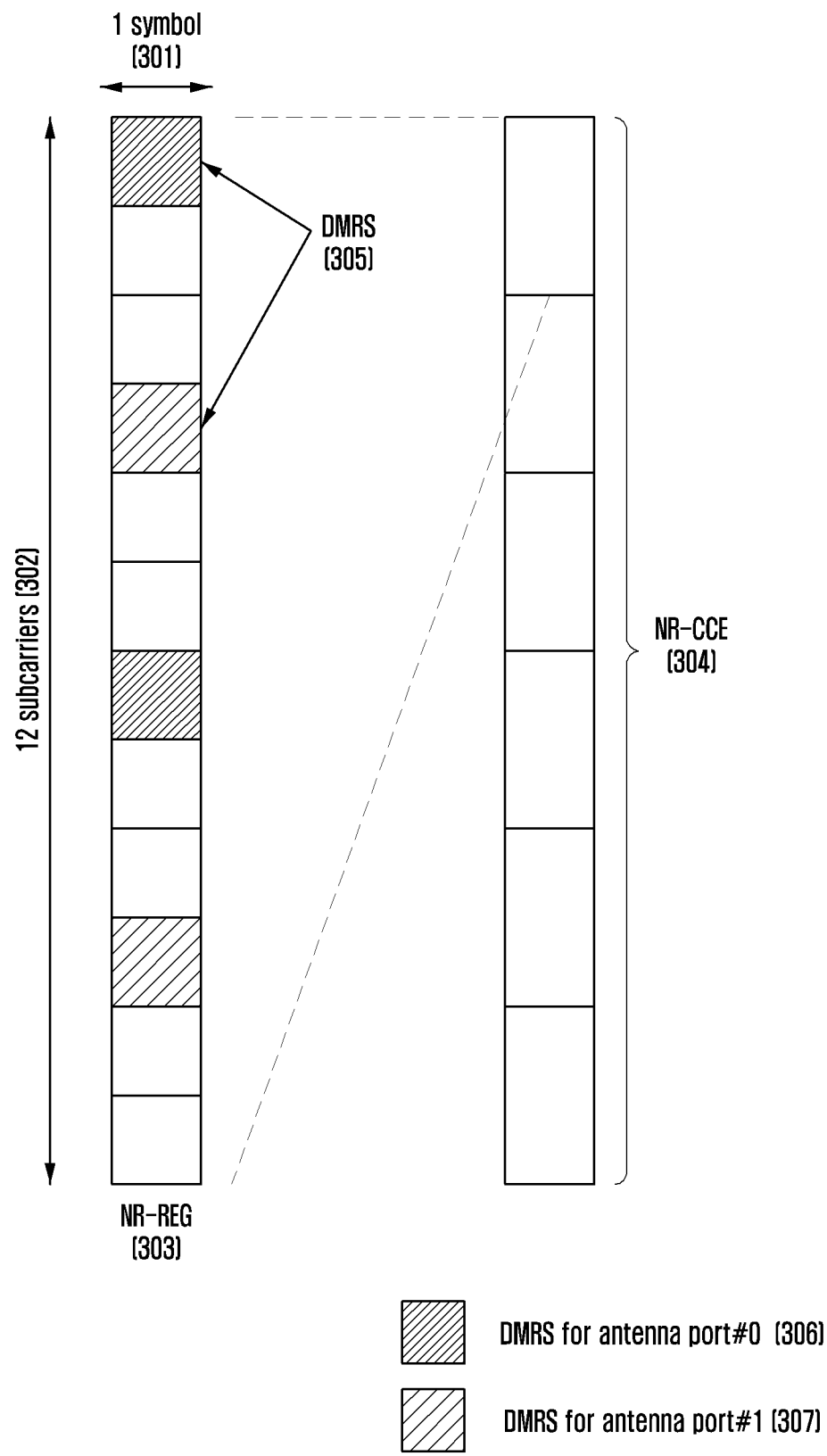
FIG. 3 is a diagram illustrating a basic unit of time and frequency resources for a downlink control channel in a 5G system.

FIG. 3 is a diagram illustrating a basic unit of time and frequency resources for a DL control channel in a 5G system.

Referring to FIG. 3, a REG, as the basic unit of time and frequency resources for a control channel, is made up of one OFDM symbol 301 in the time domain and 12 subcarriers 302 (i.e. one RB), in the frequency domain. By assuming one OFDM symbol as a basic unit of control channel resources in the time domain, it may be possible to multiplex data and control channels in one subframe. The control channel is followed by a data channel to reduce processing time at a UE, thereby facilitating meeting of the latency requirement. By using 1 RB 302 as the basic unit of control channel resources in the frequency domain, it may be possible to facilitate multiplexing the control and data channels in frequency.

By concatenating multiple NR-REGs 303, it is possible to configure various control channel regions in different sizes. For example, assuming that the basic unit of DL control channel resource allocation is NR-CCE 304 in 5G, the NR-CCE 304 may be made up of a plurality of NR-REGs 303. For example, the NR-REG 303 depicted in FIG. 3 is made up of 12 REs and, assuming one NR-CCE 304 consists of 4 NR-REGs 303, the NR-CCE 304 consists of 48 REs. If the DL control region is configured, the control region may consist of multiple NR-CCEs 304, and a certain DL control channel may be mapped to one or more NR-CCEs 304 according to the AL in the control region. The NR-CCEs 304 constituting the control region are distinguished by CCE numbers, which are assigned in a way of logical mapping.

The basic unit of DL control channel resources (i.e., the NR-REG 303) may include REs to which the DCI is mapped and REs to which DMRS 305 as a reference signal for use in decoding the DCI is mapped. Here, the DMRS 305 may be mapped based on the overhead caused by RS resource allocation so as to be transmitted efficiently. For example, if the DL control channel is transmitted over multiple OFDM symbols, the DMRS 305 may be mapped only to the first OFDM symbol.

The DMRS 305 may be mapped based on the number of antenna ports in use for transmitting the DL control channel. FIG. 3 depicts a case where two antenna ports are in use. The DMRS for antenna port #0 306 and DMRS for antenna port #1 307 may be transmitted, respectively. The DMRSs for different antenna ports may be multiplexed in various manners. FIG. 3 depicts a case where the DMRSs for different antenna ports are mapped to different REs for maintaining orthogonality. The DMRSs may be frequency-division-multiplexed (FDMed) as depicted in FIG. 3 or code-division multiplexed (CDMed). The DMRSs may be configured in various DMRS patterns in association with the number of antenna ports.

Figure 4:
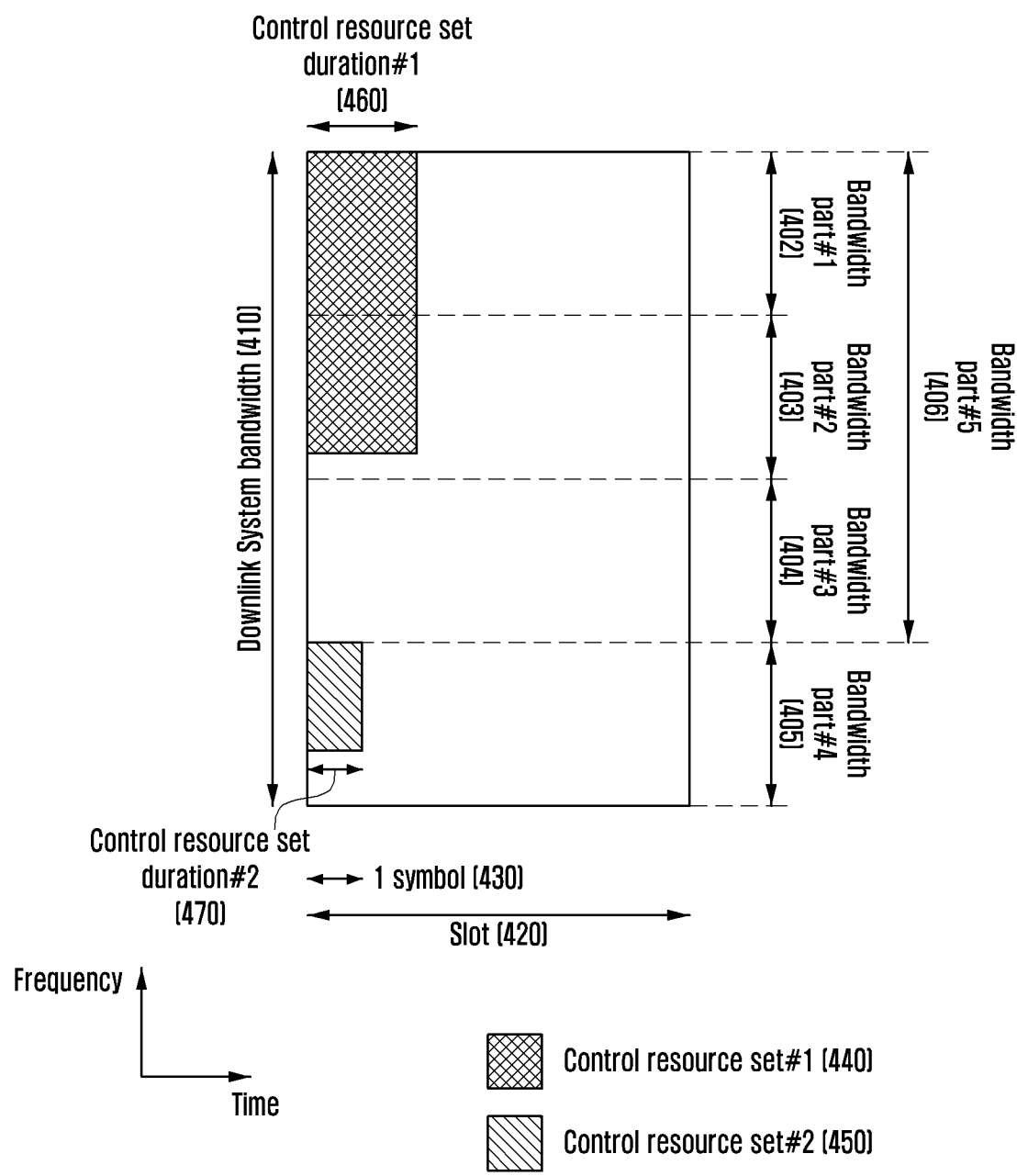
FIG. 4 is a diagram illustrating how to configure a control resource set (CORESET) for transmitting downlink control channels in a 5G wireless communication system, according to an embodiment.

FIG. 4 is a diagram for explaining a CORESET for transmitting DL control channels in a 5G wireless communication system, according to an embodiment.

Referring to FIG. 4, a resource grid that spans the system bandwidth 410 in the frequency domain and one slot 420 in the time domain is provided. Although FIG. 4 is directed to a case where one slot consists of seven OFDM symbols, the method of the present disclosure is also applicable to a case where one slot consists of fourteen OFDM symbols. In FIG. 4, the system bandwidth 410 may consist of one or more BWPs and divided into 4 BWPs: BWP #1 402, BWP #2 403, BWP #3 404, and BWP #4 405. At least two of the BWPs may be combined into another BWP like BWP #5 406.

In FIG. 4, two CORESETs (CORESET #2 440 and CORESET #2 450) are configured. CORESETs 440 and 450 may be configured to occupy specific sub-bands across the whole system bandwidth 410. In FIG. 4, CORESET #1 440 is configured across two BWPs (i.e., BWP #1 402 and BWP #2 403), while CORESET #2 is configured with one BWP (i.e., BWP #4 405). A CORESET may span one or more OFDM symbols in the time domain and its length is specified by a number of OFDM symbols as denoted by reference numbers 460 and 470. In FIG. 4, the CORESET length 460 of CORESET #1 is 2, and the CORESET length 470 of CORESET #2 is 1.

In the 5G system, it may be possible to configure multiple CORESETs according to a BS. It may also be possible to configure multiple CORESETs according to a terminal (hereinafter, interchangeably referred to as UE). It may also be possible to assign part of the CORESETs configured in the system. Accordingly, a UE may not know all of the CORESETs configured in the system. Assuming that two CORESETs (CORESET #1 440 and CORESET #2 450), can be configured in the system as shown in FIG. 4, it may be possible to configure CORESET #1 440 for UE #1 and CORESET #1 440 and CORESET #2 for UE #2. In this case, the UE #1 may not know the presence of CORESET #2 450 unless an additional indicator is used.

In 5G, a CORESET may be configured as one of a common CORESET, a UE-group common CORESET, and a UE-specific CORESET. A CORESET may be configured per UE via UE-specific signaling, UE-group common signaling, or RRC signaling. If a CORESET is configured to a UE, this means that the information on the CORESET location, CORESET sub-bands, CORESET resource allocation, and CORESET length is provided to the UE. The CORESET configuration information provided to the UE may include the following information shown in Table 1 below.

TABLE 1

Configuration information 1. RB allocation in frequency domain
Configuration information 2. CORESET length in time domain (number of OFDM symbols configured for CORESET)
Configuration information 3. Resource mapping scheme (time-preference mapping, frequency-preference mapping)
Configuration information 4. Resource mapping scheme (Localized transmission scheme, Distributed transmission scheme
Configuration information 5. Search space type (common search space, UE-group search space, UE-specific search space)
Configuration information 6. Monitoring occasion (monitoring period/interval, monitoring symbol location in slot
Configuration information 7. DMRS configuration information (DMRS structure, number of DMRS ports
Configuration information 8. REG bundling size The CORESET configuration information may further include other information necessary for transmitting the DL control channel in addition to the aforementioned information.

Figure 5:
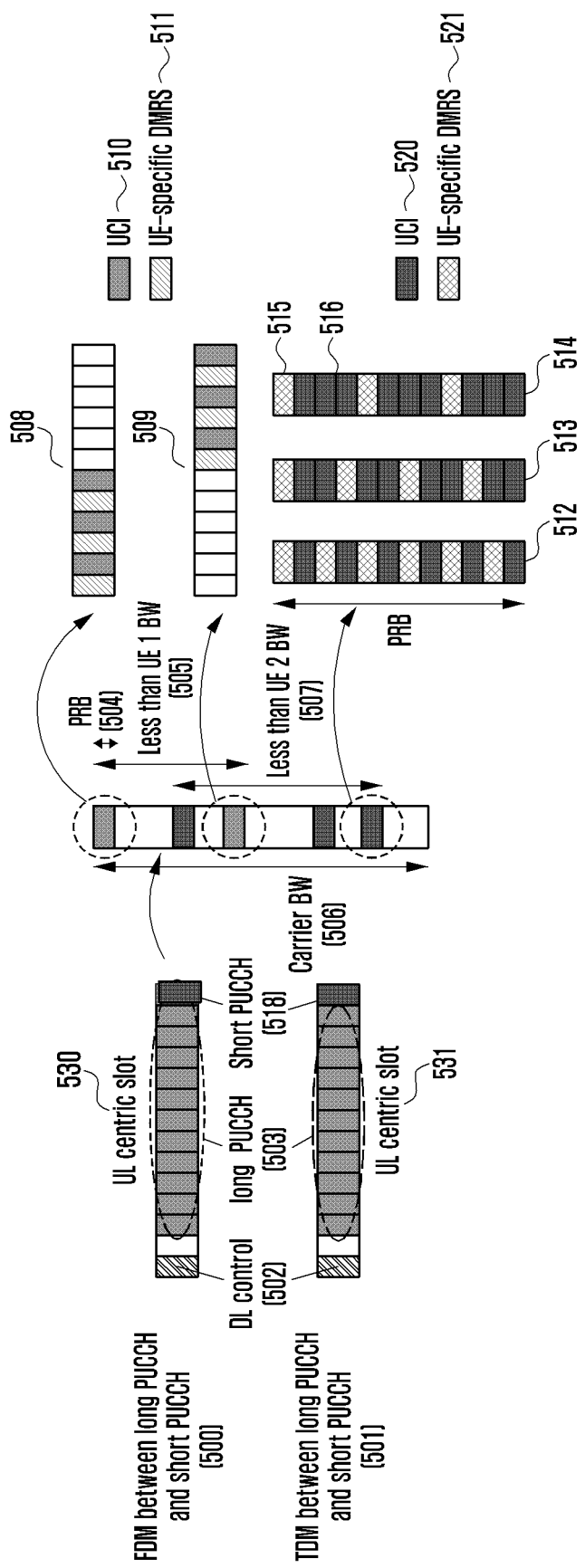
FIG. 5 is a diagram illustrating a physical uplink control channel (PUCCH) format for use in a 5G wireless communication system, according to an embodiment.

FIG. 5 is a diagram illustrating a PUCCH format for use in a 5G wireless communication system, according to an embodiment.

Although FIG. 5 is directed to a case where the UE determines the transmission period (or the start and the end symbol locations, or the start symbol location and the number symbols for transmission) of a long PUCCH for transmitting PUCCHs based on a slot, it may also be possible for the UE to determine the transmission period of a long PUCCH for transmitting PUCCHs based on a mini-slot (composed of symbols less than one slot). In the present disclosure, a PUCCH having a short transmission period (e.g., one or two symbols) for minimizing transmission delay is referred to as a short PUCCH, and a PUCCH having a long transmission period (e.g., 4 or more symbols) for securing sufficient cell coverage is referred to as a long PUCCH.

In FIG. 5, a long PUCCH and a short PUCCH are FDMed as denoted by reference number 500 and TDMed as denoted by reference number 501. A description of the slot formats for multiplexing the long and short PUCCHs is provided. Although the description is made with the slot as the basic unit of signal transmission, it may also be possible to use a different unit such as subframe and TTI.

In FIG. 5, reference numbers 530 and 531 denote slots, each composed mainly of UL symbols (i.e., UL-centric slots). A UL-centric slot is mainly composed of UL OFDM symbols. It may be possible that the OFDM symbols constituting the one UL-centric slot are all of the UL OFDM symbols or mostly UL OFDM symbols and a few DL OFDM symbols located at the beginning or end of the slot with a guard interval (or gap) between the DL and UL OFDM symbols. In FIG. 5, the UL-centric slot includes one DL OFDM symbol (i.e., the first OFDM symbol), and a plurality of UL OFDM symbols (i.e., the third to the last of the OFDM symbols). The second OFDM symbol is used as a guard interval. During the period corresponding to the UL OFDM symbols, it may be possible to UL a data channel transmission and UL a control channel transmission.

The long PUCCH 503 may be a long control channel transmitted in a discrete Fourier transform spread OFDM (DFT-S-OFDM) scheme as a single carrier transmission scheme rather than the OFDM transmission scheme because the long control channel is used to expand the cell coverage. Accordingly, it is necessary to transmit the control channel on contiguous subcarriers and, in order to achieve a frequency diversity effect, the long PUCCH 503 should be arranged at discrete locations as denoted by reference numbers 508 and 509. The frequency distance 505 should be less than or equal to the UL bandwidth supported by or configured to the UE, which performs long PUCCH 503 transmission in PRB-1 at the beginning of the slot as denoted by reference number 508 and in PRB-2 at the end of the slot as denoted by reference number 509. A PRB is the smallest unit of transmission in the frequency domain and consists of 12 subcarriers. Accordingly, the distance between PRB-1 and PRB-2 should be less than or equal to the maximum supportable bandwidth of the UE or the UL transmission bandwidth configured to the UE, and the maximum supportable bandwidth of the UE may be less than or equal to the bandwidth 506 supported by the system.

The frequency resources PRB-1 and PRB-2 may be configured to the UE such that the frequency resources are mapped to corresponding bit fields via higher layer signaling and notify the UE of the frequency resources to be used using a bit field included in a DL control channel. Both the control channel being transmitted at the beginning of the slot as denoted by reference number 508 and the control channel being transmitted at the end of the slot as denoted by reference number 509 include UL control information (UCI) 510 and a UE-specific reference signal 511, and it is assumed that the two signals are visually distinguished from each other and transmitted at different OFDM symbols.

The short PUCCH 518 may be transmitted in any of DL-centric and UL-centric slots, particularly at the last symbol or OFDM symbols at the end of the slot (e.g., the last OFDM symbol, the next to the last OFDM symbol, or the last two OFDM symbols). It may also be possible to transmit the short PUCCH 518 at an arbitrary location in the slot. The short PUCCH 518 may be mapped to one or multiple OFDM symbols. In FIG. 5, for example, the short PUCCH 518 is mapped to the last symbol of the slot.

The radio resources for a short PUCCH 518 are allocated by PRB such that the PUCCH are mapped to consecutive or discrete multiple PRBs in the frequency domain. The allocated PRBs should be included in a band that is equal to or narrower than the frequency band 507 supported by the UE or the UL transmission bandwidth that the BS has configured to the UE. The multiple PRBs may be allocated frequency resources configured to the UE via higher layer signaling such that the frequency resources are mapped to corresponding bit fields, and the multiple PRBs may notify the UE of the frequency resources to be used via a bit field included in the DL control channel.

The UCI 520 and DMRS 521 are frequency-multiplexed in a PRB such that the DMRS 521 are transmitted on one subcarrier per two subcarriers as denoted by reference number 512, per three subcarriers as denoted by reference number 513, or per four subcarriers as denoted by reference number 514. One of the DMRS 521 transmission schemes 512, 513, and 514 may be configured via higher layer signaling. The UE may transmit the DMRS 521 and DCI multiplexed as indicated via higher layer signaling.

It may also be possible to determine the DMRS transmission scheme based on the number of bits of the UCI 520. If the number of bits of the UCI 520 is small, the UE may multiplex the DMRS 521 and the UCI 520 into a control channel as denoted by reference number 512. In the case where the number of bits of the UCI is small, it is possible to achieve a transmission coding rate with reduced resources sufficient for UCI 520 transmission. If the number of bits of the UCI 520 is large, the UE may multiplex the DMRS 521 and UCI 520 into a control channel as denoted by reference number 514. In the case where the number of bits of the UCI 520 is large, it is necessary to use a large amount of the resources for UCI 520 transmission at a reduced transmission coding rate.

The UE may determine whether to use the long PUCCH 503 or short PUCCH 518 in a slot or a mini-slot for transmitting the UCI 520 based on the information indicating the use of the long or short PUCCH, which is received from the BS via higher layer signaling. It may also be possible to make such a determination based on the information indicating the use of the long or short PUCCH, which is received from the BS via physical layer signaling. It may also be possible to make such a determination based on the information obtained implicitly from the number of UL symbols of the slot or mini-slot. For example, the UE may transmit the UCI 520 using the short PUCCH 518 for a case in which the number of UL symbols included in the slot or mini-slot, notified or configured by the BS, for UCI 520 transmission is 1 or 2, and the UE may transmit the UCI 520 using the long PUCCH 503 for a case in which the number of UL symbols included in the slot or mini-slot is 4 to 14.

It may also be possible for the UE to determine whether to use the long PUCCH 503 or short PUCCH 518 for transmitting the UCI 520 in the slot or mini-slot based on the information indicating the waveform of message 3 (msg3), which is included in message 2 (msg2), being transmitted in the random access procedure. That is, if the information indicating the waveform of msg3, which is included in msg2, is set to CP-OFMD, the UE transmits the UCI 520 with the short PUCCH 518 using the CP-OFDM waveform. If the information indicating the waveform of msg3 which is included in msg2 is set to DFT-S-OFDM, the UE transmits the UCI 520 with the long PUCCH 503 using the DFT-S-OFDM waveform.

Next, an example of multiplexing the above-described long and short PUCCHs is provided. It may be possible to frequency-multiplex long and short PUCCHs for different UEs into one slot 530 as denoted by reference number 500. In this case, the BS may configure the short and long PUCCH frequency resources without being overlapped in one PRB, as shown in FIG. 5. However, if configuring different PUCCH transmission resources for all individual UEs causes frequency resources to be wasted and constrained, the frequency resources need to be largely allocated for UL data channel transmission rather than UL control channel transmission. Accordingly, the short and long PUCCH resources allocated for different UEs may be overlapped, and the BS may prevent the scheduled resources and UE-specific transmission resources from colliding with each other in one slot. However, for a case where it is impossible to avoid collision between the short and long PUCCH transmission resources, a method is needed for the BS to be able to configure the long and short transmission resources so that they do not collide and for the UE to make adjustment to the long PUCCH 503 transmission resources according to an instruction from the BS. According to a method, the short and long PUCCH transmission resources may be time-multiplexed in one slot 531.

In order to support various types of services in the 5G wireless communication system, it is necessary to design the system based on forward compatibility such that the future services are not restricted by the current system. This means that the 5G system should be designed such that the time and frequency resources are more flexibly utilized in comparison with the legacy LTE system. In particular, one of the most important design issues is to secure control channel flexibility. In order to accomplish this, it may be necessary to transmit the DL control channel in a specific sub-band rather than across the whole system band and allocate time and frequency resources for DL control channel transmission in a UE-specific manner.

In the 5G system, transmission and reception of signals in an ultra-broad bandwidth of a few dozen or hundred MHz or a small number of GHz is being considering to support ultra-high speed data services that require a data rate of a few Gbps. However, considering that power consumption increases in proportion to transmission/reception bandwidth, it is necessary to manage the power consumption of the UE and the BS efficiently by adapting the transmission/reception bandwidth to the situation. Controlling power consumption is more important in the battery-powered UE than in the BS connected to a constant power source. Accordingly, consideration may be given to BS switching when there is no need of ultra-high bandwidth signal transmission/reception for the UE, and the transmission/reception band of the UE to a narrow band to reduce power consumption.

For transmission/reception bandwidth adaptation or switching, it is necessary for the BS to configure the CORESETs to transmit the DL control channel and resources efficiently, and the PUCCH to the UE efficiently. In the case where the UE is assigned the UL and DL bandwidths in different BWPs, there is a need of a method for making it possible for the UE to configure the PUCCH resources in a BWP-specific manner, select the PUCCH resources, and switch between BWPs.

Figure 6:
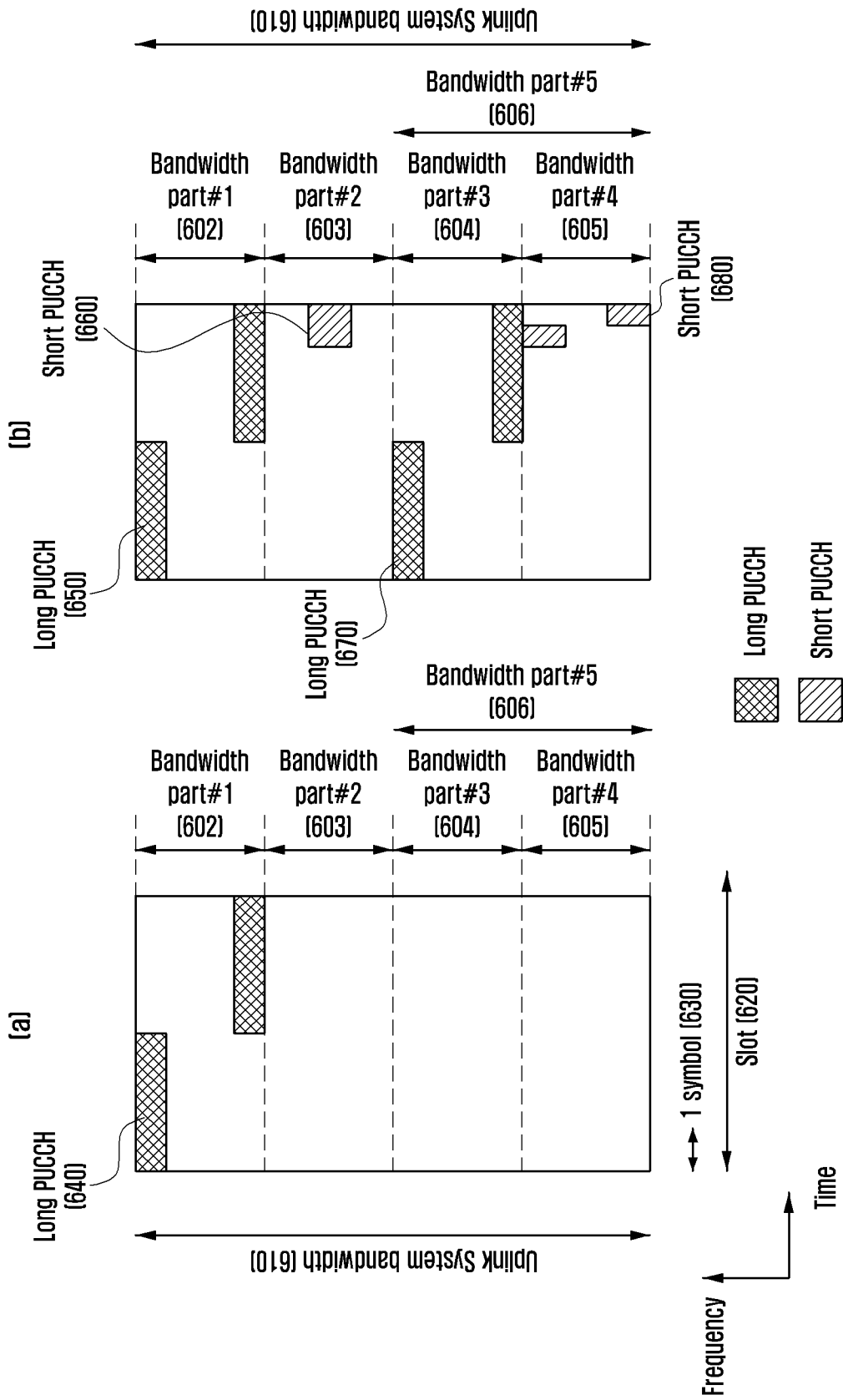
FIG. 6 is a diagram illustrating a method for configuring a PUCCH format and resource regions in a 5G wireless communication system, according to an embodiment.

FIG. 6 is a diagram illustrating a method for configuring a PUCCH format and resource regions in a 5G wireless communication system, according to an embodiment.

FIG. 6 depicts a resource grid that spans the UL system bandwidth 610 in the frequency domain and one slot 620 in the time domain. Although FIG. 6 is directed to the case where one slot consists of seven OFDM symbols, the method of the present disclosure is also applicable to a case where one slot consists of fourteen OFDM symbols. In FIG. 6, the UL system bandwidth 610 may consist of one or more UL BWPs, and the UL system bandwidth 610 is divided into 4 BWPs: BWP #1 602, BWP #2 603, BWP #3 604, and BWP #4 605. At least two of the BWPs may be combined into another BWP, such as BWP #5 606. The UE may activate one or more BWPs for use in a certain time period (symbol, slot, subframe, or frame). A BWP may be activated or deactivated via at least one of higher layer signaling, DCI conveyed in a DL control channel, MAC CE, and BWP activation/deactivation timer.

Here, the PUCCH transmission resources may be configured for all, one, or some of the BWPs. The PUCCH transmission resources may be configured per UE via UE-specific signaling, UE-group common signaling, or RRC signaling. If PUCCH transmission resources are configured to a UE, the UE is provided with information such as a control channel transmission region location, control channel sub-band, control channel resource allocation, and control channel length. The PUCCH configuration information may include at least the following information, as shown below in Table 2.

TABLE 2

Configuration information 1. UL control channel frequency-domain RB allocation information
Configuration information 2. UL control channel time-domain allocation information (start symbol location of control channel)
Configuration information 3. UL control channel time-domain length (number of OFDM symbols for control channel) or format TABLE 2-continued Configuration information 4. Waveform (OFDM or DFT-S-OFDM) of UL channel
Configuration information 5. Frequency hopping mode of UL control channel A more detailed description is made with reference to parts (a) and (b) of FIG. 6. The UE configured with multiple BWPs as shown in part (a) of FIG. 6 may be allocated multiple long PUCCH transmission resources 640 in one of the configured BWPs. It may also be possible that the UE is allocated each of PUCCH transmission resources 650, 660, 670, and 680 in each of the configured BWPs, respectively, as shown in part (b) of FIG. 6. It may also be possible that the UE is allocated PUCCH transmission resources in some of the configured BWPs. Here, the PUCCH transmission resources may be configured independently per BWP.

The BS may configure the PUCCH transmission resources based on the maximum frequency bandwidth supported by the UE without considering the BWP. For example, the BS may configure the PUCCH transmission resources 650 and 680 based on the maximum UL frequency bandwidth 610 of the UE. In this case, it may be possible for the UE to assume the long PUCCH 650 in the BWP #1 602, the short PUCCH 680 in the BWP #4, and no PUCCH in the BWP #2 603 and BWP #3 604, based on the PUCCH transmission resources and UL BWPs configured by the BS. Although, as shown in FIG. 6, each BWP is configured to have a type of PUCCH or nothing, it may also be possible for each BWP to be configured to have one or more types of PUCCHs.

At least one of the information elements contained in the PUCCH configuration information as listed in Table 2 may be predefined between the BS and the UE or configured via high layer signaling or system information (e.g., a signal transmitted along with SI-RNTI) from the BS to the UE. The BS may transmit the PUCCH configuration information to the UE via higher layer signaling that is made for UL BWP configuration. In the case of configuring PUCCH transmission resources in the maximum UL bandwidth and at least one BWP supported by the UE, the BS may select one of the multiple control channel transmission resources (or PUCCH format indices or PUCCH formats) and transmit the selected control channel transmission resource information to the UE via a DL control channel. In this case, the UE may receive a DL data channel based on the DCI received on the DL control channel and transmit the acknowledgement corresponding to the DL data channel to the BS on the control channel resources indicated via the DCI.

If it is necessary for the UE to transmit a PUCCH, the UE may activate one of the deactivated BWPs (e.g., one (BWP #1 602) of the deactivated BWPs if the activated BWP (BWP #2 603) has no configured PUCCH resources) to transmit the PUCCH. If the UE is capable of activating only one UL BWP, it may assume that the BWP (BWP #2 603) that is activated but has no currently configured PUCCH resources is deactivated while the BWP (BWP #1 602) is activated for PUCCH transmission. After transmitting the PUCCH, the UE may reactivate BWP #2 603 and deactivate BWP #1 602.

In the case where UL transmission (e.g., SRS transmission) is scheduled in BWP #2 603 or another BWP (e.g., BWP #3 604) during slot in which BWP #1 602 is activated for PUCCH transmission, the UL transmissions scheduled in the BWPs with the exception of BWP #1 activated for PUCCH transmission may be skipped. At this time, the UE considers if the PUCCH transmission timing in the BWP #1 602 and the UL signal transmission timing scheduled in BWP #3 603 are overlapped (e.g., at the symbol or slot level), if it is possible to perform BWP switching, and if it is possible to perform the UL transmission scheduled in BWP #3 604 after transmitting the PUCCH in BWP #1. That is, if it is possible to perform UL transmission in BWP #3 604 at a timing (e.g., a symbol or slot) after a time period of X from the PUCCH transmission in BWP #1, the UE may activate BWP #3 604, after the PUCCH transmission in BWP #1, to transmit the UL transmission scheduled in BWP #3 604.

In a case where the UE needs to transmit a UL signal on a PUCCH, it may be possible to consider a case where there are multiple deactivated BWPs with configured PUCCH resources, even though the currently activated BWP has no configured PUCCH resources, and where multiple BWPs are activated or all or some constantly activated BWPs have configured PUCCH resources. In this case, the UE may transmit the PUCCH on the PUCCH resources configured in a predefined or preconfigured BWP or on the PUCCH resource configured in the BWP having the lowest BWP index among the activated BWPs with configured PUCCH resources. It may also be possible for the UE to transmit the PUCCH on the PUCCH resources configured in the UL BWP correlated with the DL BWP on which the DL data channel is received among the activated BWPs with the configured PUCCH resources or on the PUCCH or UL data channel configured in the UL BWP in which another UL signal transmission (other than the PUCCH transmission) is scheduled. It may also be possible for the UE to transmit the PUCCH on the PUCCH resources configured in the UL BWP that was activated most recently and, if the PUCCH carries scheduling request (SR) information, the PUCCH resources configured in the UL BWP in which the resources for use by the UE in transmitting the SR are configured.

Hereinafter, a description is of the bandwidth adaptation method for 5G communication systems.

Figure 7:
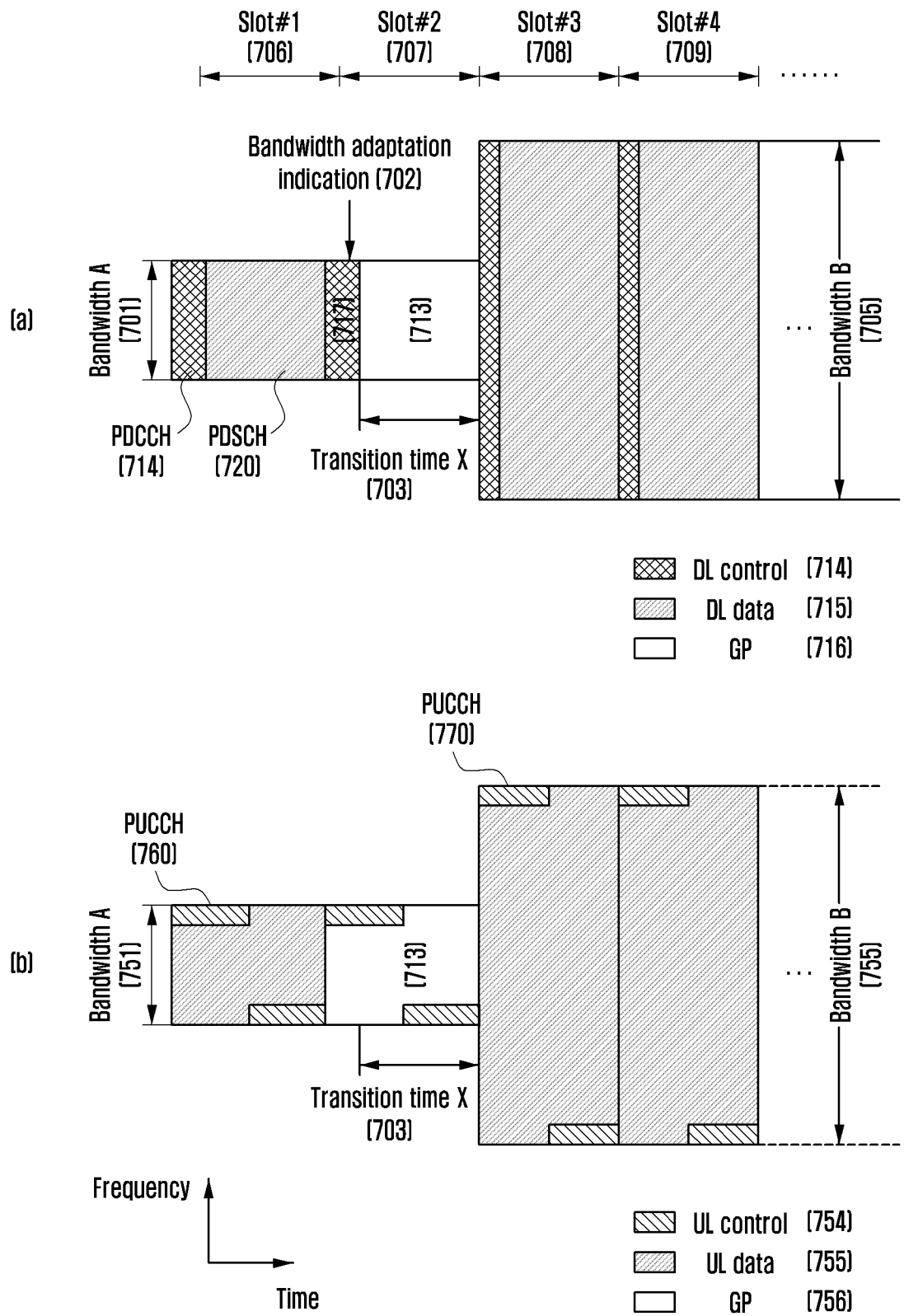
FIG. 7 is a diagram illustrating a transmission and reception bandwidth adaptation operation, according to an embodiment.

FIG. 7 is a diagram illustrating a transmission/reception bandwidth adaptation operation, according to an embodiment. The bandwidth adaptation method makes it possible to manage power consumption of the UE efficiently.

Referring to FIG. 7, the x axis is time, and the y axis is frequency. With reference to part (a) of FIG. 7 for explaining a DL bandwidth adaptation operation, the UE receives a DL control channel and a DL data channel corresponding to bandwidth A 701 from the BS in slot #1 706. The bandwidth A 701 may be a predetermined reference bandwidth, a bandwidth determined during the initial access of the UE, or a bandwidth or BWP determined through configuration signaling between the UE and the BS.

If the BS transmits a bandwidth adaptation indicator 702 to the UE to switch bandwidths with bandwidth B 705, the UE performs a bandwidth adaptation operation based on the command. Bandwidths A and B may differ in size (i.e., bandwidth A may be broader or narrower than bandwidth B). In FIG. 7, it is assumed that bandwidth B is broader than bandwidth A. Each of bandwidths A and B may be expressed by the number of PRBs or BWPs.

It takes a certain amount of time for the UE to perform decoding successfully to obtain the bandwidth adaptation indicator and to configure the radio frequency (RF) module of the UE for bandwidth switching. In FIG. 7, it takes up to the bandwidth transition time X for the UE to receive the bandwidth adaptation indicator and complete bandwidth switching based on the command. The bandwidth adaptation indicator 702 may be carried in the DL control channel 717 being transmitted to the UE, and the UE neither receives any other DL signal nor transmits any UL signal during the bandwidth transition time X 703.

The UE completes the bandwidth switching within the bandwidth transition time X and operates in the bandwidth B with slot #3 708. Accordingly, the BS may transmit a signal to the UE in the bandwidth B from slot #3 708. In FIG. 7, the BS may transmit the DL control channel and DL data channel corresponding to the bandwidth B in slot #3 708 and slot #4 709.

The bandwidth adaptation indicator 702 has a bitwidth of 1 to N (N≥1).

Bandwidth adaptation indicator configuration scheme 1 (1 bit): If there are two bandwidths (e.g., bandwidth A and bandwidth B) available for a UE, it is possible to indicate the bandwidth for the UE using a 1-bit indicator. For example, the 1-bit indicator may be set to 0 for bandwidth A or 1 for bandwidth B.

Bandwidth adaptation indicator configuration scheme 2 (N bits): It is possible to indicate one of 2N bandwidths available for the UE with an N-bit indicator. For example, a 2-bit indicator may be set to 00 for bandwidth A, 01 for bandwidth B, 10 for bandwidth C, or 11 for bandwidth D.

The BS may transmit the bandwidth adaptation indicator 702 to the UE via at least one of physical layer signaling, MAC layer signaling, and RRC layer signaling. The physical layer signaling is characterized in that the UE is capable of processing the bandwidth adaptation indicator promptly. The BS may transmit the bandwidth adaptation indicator in a UE-specific signaling manner or UE-group common signaling manner in a cell.

In the case where the DL and UL signals are transmitted/received in the same frequency band as in a time division duplex (TDD) system, if the DL BWP and UL BWP are correlated or associated with each other (e.g., change from bandwidth A to bandwidth B in DL causes change from bandwidth A to bandwidth B in UL and activation of bandwidth B in DL causes activation of bandwidth B in UL), the UL bandwidth may be switched according to DL bandwidth switching as shown in part (b) of FIG. 7. That is, if the DL bandwidth is changed, or switched from bandwidth A 701 to bandwidth B 705 as indicated by the bandwidth adaptation indicator 702 transmitted from the BS to the UE, and the UL bandwidth is also changed or switched from bandwidth. A 751 to bandwidth B 755.

As shown in part (b) of FIG. 7, each of the bandwidths configured to the UE is considered to have PUCCH transmission resources (i.e., bandwidth A 751 with PUCCH transmission resources 760 and bandwidth B 755 with PUCCH transmission resources 770). If the UE receives the DCI in slot #1 706, the DCI being conveyed in the DL control channel 714 transmitted by the BS, the UE may receive DL data on the DL data channel 720 indicated by the DCI and transmit to the BS a reception acknowledgement corresponding to the DL data (HARQ acknowledgement (ACK)) on the PUCCH resources at a timing (e.g., slot #3 708) as indicated via the DCI. Here, the UE locates the PUCCH resources, as indicated via the DCI, within the bandwidth at the timing of receiving the DCI (i.e., PUCCH resources 760 of UL bandwidth A 751 that is activated at the timing of receiving the DCI (slot #1 706) and should transmit the HARQ ACK corresponding to the DL data 720 in the bandwidth B 755 at the timing (slot #3) on the PUCCH such that the BS may assume that the UE transmits the HARQ ACK on the PUCCH resource 770 in the UL bandwidth B 755). In this case, the BS may not receive the HARQ ACK corresponding to the DL data 720 successfully. Thus, there is a need of a method for the UE and the BS to determine the UL bandwidth switching timing or PUCCH transmission resources accurately in a situation where the UL bandwidth changes in correlation with the change of the DL bandwidth. The following two methods are disclosed.

Method 1: To determine the PUCCH transmission resources based on the UL bandwidth activated at the PUCCH transmission start time or in predetermined time K before the PUCCH transmission start time.

Method 2: To change a corresponding UL bandwidth at a timing (symbol or slot) of transmitting HARQ ACK corresponding to the DL data received in the DL bandwidth changed upon receipt of the bandwidth adaptation indicator.

Method 1 is described in more detail with reference to FIG. 7.

In the case where the DL and UL signals are transmitted/received in the same frequency band (or the DL and UL frequency bands have the same center frequency), as in the TDD system, or the DL and UL BWPs are correlated or associated with each other (e.g., a change from bandwidth A to bandwidth B in the DL causes change from bandwidth A to bandwidth B in the UL and activation of bandwidth B in the DL causes activation of bandwidth B in the UL), the UL bandwidth may be changed according to the change of the DL bandwidth.

That is, if the DL bandwidth A 701 is adjusted or changed to the DL bandwidth B 705 as indicated by the bandwidth adaptation indicator 702 that is transmitted from the BS to the UE. In addition, the UL bandwidth A 751 may also be changed to the UL bandwidth B 755 and, in this case, the UL bandwidth switching timing (symbol or slot) may be identical with the DL bandwidth switching timing. The UL bandwidth switching timing (symbol or symbol) may appear after a time X from the DL bandwidth switching timing, where X may be equal in length to or less than a symbol or a slot. The value of X may be determined based on the UE capability or predefined between the BS and the UE. The value of X may be configured to the UE via a higher layer signal or system information (e.g., a signal transmitted with SI-RNTI) from the BS. The BS may transmit a higher layer signal including the value of X for configuring the UL BWP to the UE.

In a case in which the UL bandwidths configured to the UE have respective PUCCH transmission resources (i.e., bandwidth A 751 and bandwidth B 755 have the PUCCH transmission resources 760 and 770, respectively, as shown in part (b) of FIG. 7), Upon receipt of the DCI conveyed in the DL control channel 714 that the BS transmits at slot #1 706, the UE may receive DL data on the DL data channel 720 indicated via the DCI and transmit the HARQ ACK corresponding to the DL data to the BS on the PUCCH resources indicated via the DCI at a timing (e.g., slot #3 708) indicated via the DCI. In this case, the BS may assume that the UE transmits the HARQ ACK on the PUCCH resources of the bandwidth activated at the timing (slot #3 708) that should carry the HARQ ACK corresponding to the DL data 720 (i.e., PUCCH 770 of bandwidth B 755) according to Method 1, above, thereby being able to receive the HARQ ACK corresponding to the DL data 720 successfully.

It is also possible to configure the PUCCH resources separately for UL bandwidths A and B of the UE.

Figure 8:
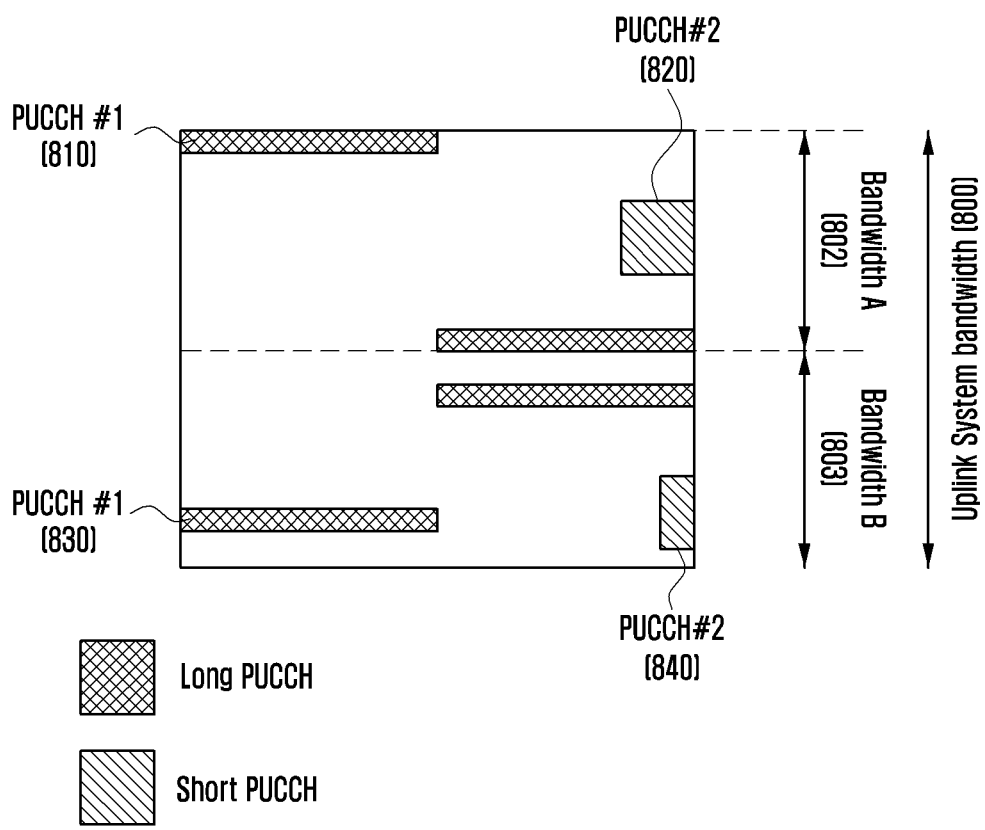
FIG. 8 is a diagram illustrating a transmission and reception bandwidth adaptation operation, according to an embodiment.

FIG. 8 is a diagram illustrating a transmission/reception bandwidth adaptation operation, according to an embodiment.

Referring to FIG. 8, the UL bandwidths assigned to the UE (i.e., UL bandwidths A and B 802 and 803) constituting the UL system bandwidth, may be configured with respective PUCCH resources. For example, the UE may be configured with PUCCH #1 810 and PUCCH #2 820 in bandwidth A 802 and PUCCH #1 830 and PUCCH #2 840 in bandwidth B 803. The UE may receive the configuration values, such as PUCCH format, length, and frequency resource location per bandwidth, separately. The bandwidths A and B 802 and 803 are independently configured with different configuration values of PUCCH format, length, and frequency resource location.

Assuming that the UE transmits the HARQ ACK on the PUCCH 770 in the bandwidth activated at the timing when the HARQ ACK corresponding to the DL data 720 is scheduled (slot #3 708) as indicated via the DCI 714 according to Method 1, it may be determined that the PUCCH transmission timing and resources (or PUCCH format index or PUCCH format) indicated via the DCI 714 are the PUCCH transmission timing and resources (or PUCCH format index or PUCCH format) in the bandwidth activated at the timing when the HARQ ACK corresponding to the DL data 720 (slot #3 708) as indicated via DCI 714 (other than the bandwidth activated at timing of receipt of the DCI 714 (slot #1 706)). That is, the UE determines that the PUCCH transmission timing and resources (or PUCCH format index or PUCCH format, e.g., PUCCH #1) indicated via the DCI 714 is the PUCCH transmission timing and resources (or PUCCH format index or PUCCH format) of the bandwidth activated at the timing when the HARQ ACK corresponding to the DL data 720 is transmitted (slot #3 708) as indicated via DCI 714. In other words, the UE determines that the PUCCH transmission timing and resources indicated via the DCI 714 are PUCCH #1 830 of bandwidth B 803 activated at slot #3, as illustrated in FIG. 8, and transmits the HARQ ACK corresponding to the DL data 720 on the PUCCH #1 830.

In the case where the configurations of the PUCCH transmission resources (or PUCCH format index or PUCCH format) differ per BWP so as not to be mapped one by one (e.g., when BWP A is configured with 3 PUCCH resources and BWP B is configured with 2 PUCCH resources), the UE may determine the PUCCH transmission timing and resources (or PUCCH format index or PUCCH format, such as PUCCH #1) through a modulo operation. In the case where the UE is assigned the BWP A configured with 3 PUCCH resources and the BWP B is configured with 2 PUCCH resources, if the BWP A is activated, it may be possible to assume that the bandwidth activated at the timing when the HARQ ACK corresponding to the DL data 720 is transmitted (slot #3) as indicated via the DCI 714 is the BWP B. The PUCCH transmission timing and resources (or PUCCH format index or PUCCH format) used by the UE in PUCCH transmission may be determined based on a value obtained through a modulo operation between the PUCCH resources (or PUCCH format index or PUCCH format) indicated via the DCI 714 and a value of the PUCCH resources (or PUCCH format index or PUCCH format) configured in the changed BWP B.

As described above, the BWP A is configured with three PUCCH resources (PUCCH #1, PUCCH #2, and PUCCH #3) and BWP B is configured with two PUCCH resources (PUCCH #1 and PUCCH #2), however the DCI 714 may indicate the PUCCH #3 for PUCCH transmission. In this case, the UE may transmit the PUCCH on the PUCCH resources determined as a result of the modulo operation performed on the indicated control channel resources with a value of the control channel resources (or PUCCH format index or PUCCH format) configured in the changed BWP B (i.e., PUCCH #1 configured in the BWP B).

Figure 9:
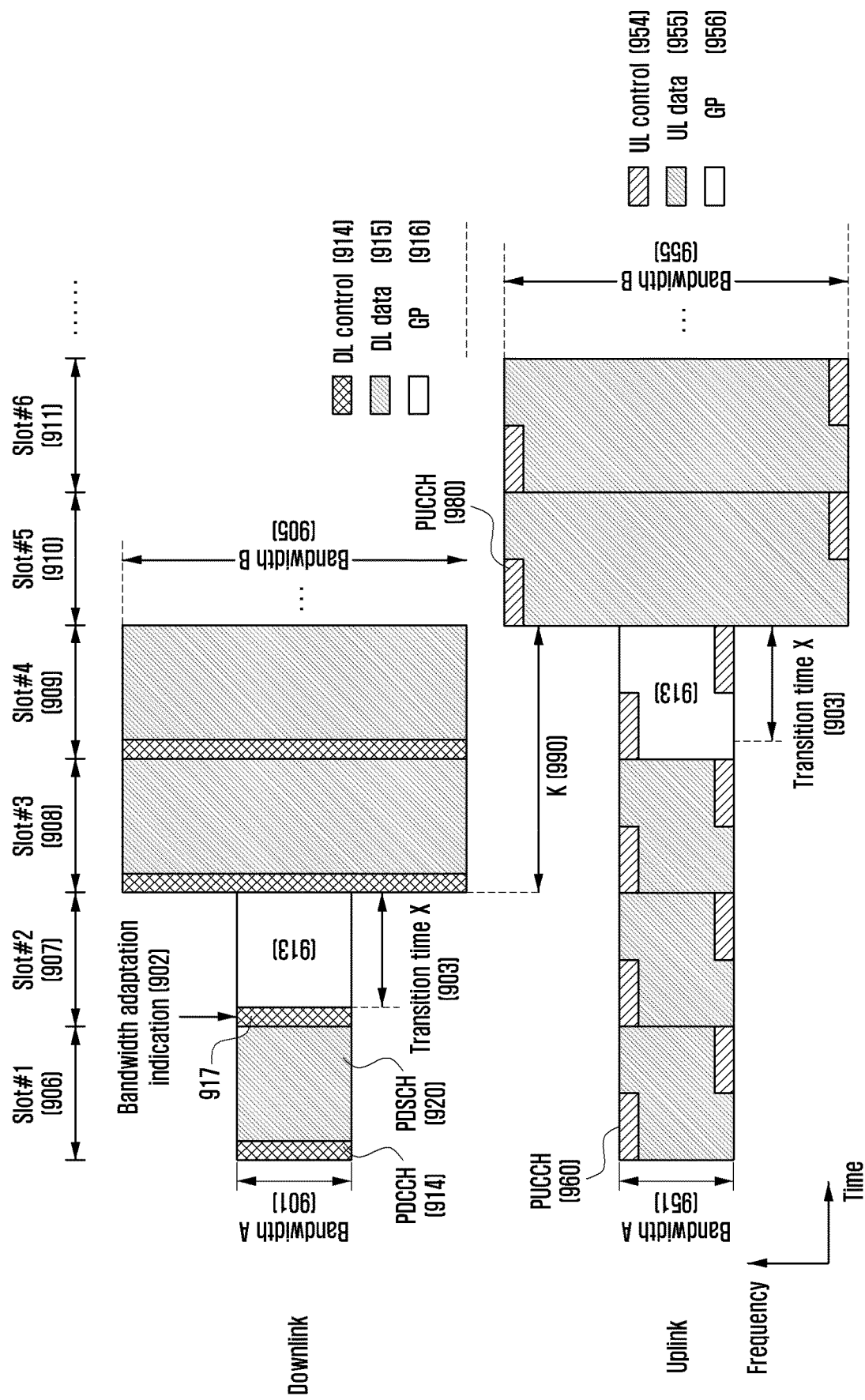
FIG. 9 is a diagram illustrating a transmission and reception bandwidth adaptation operation, according to an embodiment.

Method 2, above, is described in more detail with reference to FIG. 9. FIG. 9 is a diagram illustrating a transmission/reception bandwidth adaptation operation, according to an embodiment.

In the case where the DL and UL signals are transmitted/received in the same frequency band (or the DL and UL frequency bands have the same center frequency), as in the TDD system, or the DL and UL BWPs are correlated or associated with each other (e.g., a change from bandwidth A to bandwidth B in the DL causes a change from bandwidth A to bandwidth B in the UL and an activation of bandwidth B in the DL causes an activation of bandwidth B in the UL), the UL bandwidth may be changed according to the change of the DL bandwidth as shown in FIG. 9.

That is, referring to FIG. 9, if the DL bandwidth A 901 is adjusted or changed to the DL bandwidth B 705 as indicated by the bandwidth adaptation indicator 902 that is transmitted from the BS to the UE, the UL bandwidth A 951 may also be changed to the UL bandwidth B 955 and, it may be assumed that the UL bandwidth switching timing (symbol or slot) is identical with the DL bandwidth switching timing as in Method 1, above. If it is assumed that the UL and DL bandwidth switching timings are identical with each other as in Method 1 described with reference to FIG. 7, the UE has to determine that the PUCCH is transmitted using the PUCCH transmission timing and resources (or PUCCH format index or PUCCH format) in the bandwidth activated at the timing of transmitting the HARQ ACK corresponding to the DL data 720 as indicated via the DCI 714 (slot #3 708) rather than the bandwidth activated at the timing of receiving the DCI 714 (slot #1 706). Thus, it may be difficult to secure sufficient processing time of the UE between the PUCCH transmission resources determination time and the PUCCH transmission execution time.

In Method 2, by changing the UL bandwidth at the timing (symbol or slot) when the HARQ ACK corresponding to the DL data received in the DL bandwidth changed upon receipt of the bandwidth adaptation indicator is transmitted, the UE may determine the PUCCH transmission resources based on the bandwidth activated at the timing of receiving the DCI 714 (slot #1 706). That is, it is assumed that the PUCCH transmission resources are configured for the respective UL bandwidths assigned to the UE (i.e., bandwidth A 951 and bandwidth B 955 are configured with PUCCH resources 960 and 970, respectively, as shown in FIG. 9). If the UE receives the DCI transmitted by the BS on the DL control channel 914 at slot #1 906, it may receive the DL data on the DL data channel 920 indicated via the DCI and transmit the HARQ ACK corresponding to the DL data on the PUCCH resources indicated via the DCI 914, among the PUCCH resources (PUCCH format indices or PUCCH formats) configured in the UL bandwidth A 951 activated at the timing of receiving the DCI (e.g., slot #1 906).

Method 2 may alternatively be described such that the UE performs bandwidth switching from the DL bandwidth A 901 to the DL bandwidth B 905 according to the bandwidth adaptation indicator 902 transmitted by the BS. The UL bandwidth of the UE may be adjusted or switched from the UL bandwidth A 951 to the UL bandwidth B 955 and, in this case, it may be determined that the UL bandwidth switching timing (symbol or slot) appears after time K 990 (symbol or slot) after the DL bandwidth switching timing. Here, K 990 may be greater than or equal to the symbol or slot length and determined based on the UE capability or may be a predefined length (symbol or slot) between the BS and the UE. The value of K 990 may be configured to the UE via a higher layer signal or system information (e.g., a signal transmitted with SI-RNTI) from the BS. The BS may transmit the value of K 990 via a higher layer signal for configuring the UL BWP to the UE. It may also be possible to transmit to the UE the value of K 990 in the signal carrying the bandwidth adaptation indicator.

Alternatively, if the UE adjusts or switches its DL bandwidth from DL bandwidth A 901 to DL bandwidth B 905 based on the bandwidth adaptation indicator received from the BS, the UL bandwidth of the UE may also be adjusted or switched from the UL bandwidth A 951 to the UL bandwidth B 955 and, in this case, it may be possible to determine that the UL bandwidth switching timing (symbol or slot) appears at a time right before the timing when the HARQ ACK corresponding to the DL data transmitted in the changed DL bandwidth is reported or transmitted to the BS on the PUCCH or time X before the corresponding timing. Here, the PUCCH being transmitted before switching to the UL bandwidth B 955 is the PUCCH determined based on the UL bandwidth A 951.

Alternatively, if the UE adjusts or switches its DL bandwidth from DL bandwidth A 901 to DL bandwidth B 905 based on the bandwidth adaptation indicator received from the BS, the UL bandwidth of the UE may also be adjusted or switched from the UL bandwidth A 951 to the UL bandwidth B 955 and, in this case, it may be possible to determine that the UL bandwidth switching timing (symbol or slot) appears at a time right before the timing when the HARQ ACK corresponding to the DL data transmitted in the changed DL bandwidth is initially reported or transmitted to the BS on the PUCCH or a time X before the corresponding timing. Here, the value of X may be less than or equal to the symbol length or slot length and determined based on the UE capability or may be a predefined symbol or slot length between the BS and the UE. The value of X may be configured to the UE via a higher layer signal or system information (e.g., signal transmitted with SI-RNTI) from the BS. The BS may transmit the value of X via a higher layer signal for configuring the UL BWP to the UE. Here, the PUCCH being transmitted before switching to the UL bandwidth B 955 is the PUCCH determined based on the UL bandwidth A 951.

Based on the UL bandwidth switching timing determined through Method 2, as described above, the UE may assume that the PUCCH is configured or indicated to be transmitted along with the bandwidth switching timing after the UL bandwidth switching timing is transmitted using the PUCCH resources (or PUCCH format index or PUCCH format) 980 determined based on the changed bandwidth B 955 and the PUCCH to be transmitted before the UL bandwidth switching timing is transmitted using the PUCCH resources 960 determined based on the UL bandwidth A 951.

The UE may obtain PUCCH configuration information (e.g., PUCCH format, PUCCH length, sequence, frequency hopping, time/frequency resource allocation, and orthogonal sequence information) for transmitting the PUCCH conveying UCI (e.g., a SR, a DL data channel reception result (HARQ-ACK), and channel state information (CSI)) and determine the PUCCH configuration information for use in transmitting the UCI.

Figure 10:
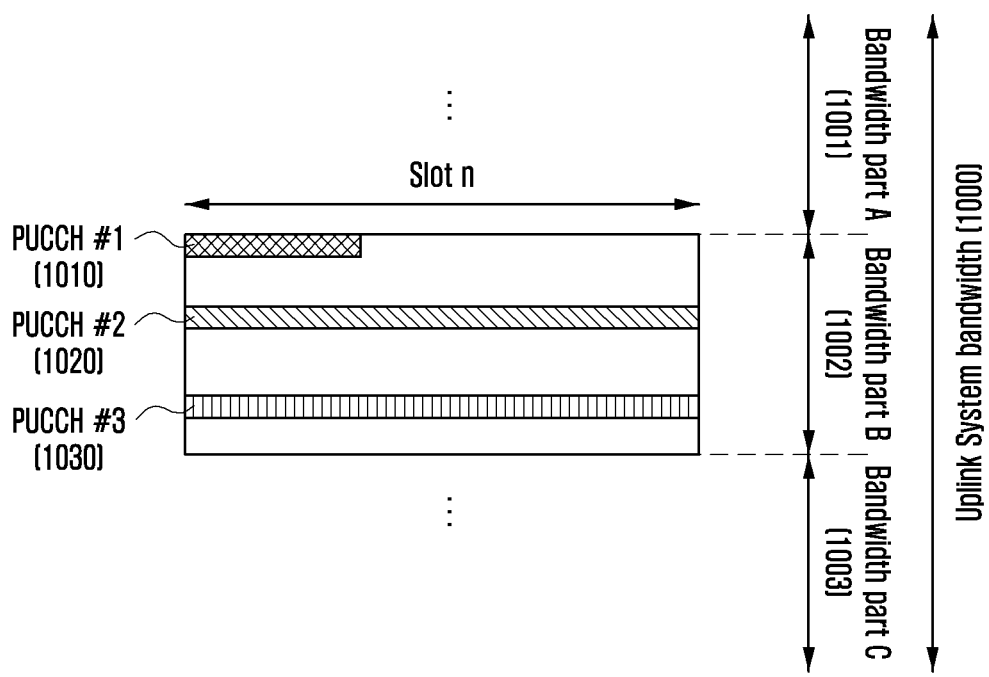
FIG. 10 is a diagram illustrating a transmission and reception bandwidth adaptation operation, according to an embodiment.

FIG. 10 is a diagram illustrating a transmission/reception bandwidth adaptation operation, according to an embodiment.

FIG. 10 depicts a case in which the PUCCH is transmitted during the slot n in the UL BWP 1002, as part of the UL system bandwidth 100. The UE, may receive configuration information about the PUCCH 1010 for transmitting the SR information. The UE may be configured with multiple PUCCHs to make a distinction among the SRs for UL transmissions of data or logical channels, or logical channel groups.

Referring to FIG. 10, PUCCH #1 1010 comprises PUCCH resources for transmitting SR information associated with the first logical channel, and PUCCH #2 1020 comprises PUCCH resources for transmitting SR information associated with the second logical channel. If it is necessary for the UE to transmit UL data on the first logical channel, the UE may transmit the SR information to the BS on the PUCCH #1 1010 such that the BS configures or allocates UL data channel transmission resources appropriate for the logical channel (first logical channel) of which data the UE wants to transmit.

The UE may also be configured with a PUCCH 1030 for transmitting the HARQ ACK corresponding to the DL data channel received at slot n or earlier to the BS. The configuration information for PUCCHs carrying UCI may be configured independently. That is, the PUCCH transmission formats for PUCCH #1 1010, PUCCH #2 1020, and PUCCH #3 1030 may be configured independently. Accordingly, the PUCCH transmission format may differ among PUCCH #1 1010, PUCCH #2 1020, and PUCCH #3 1030. Additionally, the PUCCH transmission lengths or PUCCH transmission duration lengths of PUCCH #1 1010, PUCCH #2 1020, and PUCCH #3 1030 may be configured independently. Accordingly, the PUCCH transmission length or PUCCH transmission duration length may differ among PUCCH #1 1010, PUCCH #2 1020, and PUCCH #3 1030.

The UE may receive multiple PUCCH configurations for transmitting the HARQ ACK corresponding to the DL data received at slot n or earlier to the BS via higher layer signaling. The DCI for scheduling the DL data channel may include an indicator indicating the PUCCH configuration for use by the UE in transmitting the HARQ ACK corresponding to the DL data channel among the multiple PUCCH configurations signaled to the UE. The UE may transmit the HARQ ACK using the PUCCH resources 1030 as indicated by the indicator.

In the case where the UE transmits, at slot n, the HARQ ACK corresponding to the DL data channel received from the BS at slot n or earlier, if the SR information is also transmitted at slot n (i.e., when multiple UCIs are transmitted at slot n), the UE may transmit the UCIs on the respective PUCCHs or one or more UCIs on one of the multiple PUCCHs. Typically, it is preferable to transmit the UCIs using only one of the multiple PUCCHs because the transmit power for use by the UE in transmitting a signal is limited.

For example, the UE may transmit the HARQ ACK corresponding to the DL data along with the SR information on PUCCH #1 1010. Because the BS determines that the UE transmits the HARQ ACK corresponding to the DL data channel on PUCCH #3 1030 at slot n, if the HARQ ACK corresponding to the DL data channel is received on PUCCH #1 1010 configured for use by the UE in transmitting the SR information, the BS may determine that the UE has transmitted the HARQ ACK corresponding to the DL data channel and the SR information for a logical channel corresponding to PUCCH #1 1010. In the case of transmitting the SR information for the logical channel corresponding to PUCCH #2 1020 at slot n, the UE may transmit the HARQ ACK corresponding to the DL data channel on PUCCH #2 1020. If the BS receives the HARQ ACK corresponding to the DL data channel on PUCCH #2 1020 configured for use by the UE in transmitting the SR information, it may determine that the UE has transmitted the HARQ ACK corresponding to the DL data channel and the SR information for the logical channel corresponding to PUCCH #2 1020. In this case, the UCIs may differ in at least one of PUCCH format, PUCCH length (or number of symbols occupied by PUCCH in the time domain), transmission sequence, orthogonal sequence, and cyclic shift. Although it may be assumed that the UCIs differ in PUCCH length, the method of the present disclosure is also applicable to cases where the UCIs differ in at least one of the PUCCH attributes including PUCCH format, PUCCH sequence, and PUCCH orthogonal sequence.

FIG. 10 depicts PUCCHs with different PUCCH lengths corresponding to UCIs. For example, PUCCH #1 1010 carries SR information corresponding to the first logical channel at slot n, PUCCH #2 1020 carries SR information corresponding to the second logical channel at slot n, and PUCCH #3 1030 carries the HARQ ACK corresponding to the DL data channel at slot n as configured via the DCI, which is transmitted by the BS for scheduling the DL data. If the SR information corresponding to the first logical channel and the HARQ ACK corresponding to the DL data are determined to be simultaneously transmitted at slot n, the UE may transmit to the BS both the SR information corresponding to the first logical channel and the HARQ ACK corresponding to the DL data channel on PUCCH #1 1010. In this case, however, the configuration information (i.e., the PUCCH length) about PUCCH #3 1030 differs from the configuration information about PUCCH #1 1010.

In the case where different UCIs are transmitted simultaneously or the PUCCH transmission resources corresponding to the different UCIs are overlapped over at least one symbol in the time domain, the UE may transmit the UCI on one of the PUCCHs corresponding to the respective UCIs. If it is necessary to transmit both the SR information corresponding to the first logical channel and the HARQ ACK corresponding to the DL data channel simultaneously in slot n or if the PUCCH for transmitting the SR information corresponding to the first logical channel (PUCCH #1) and the PUCCH for transmitting the HARQ ACK corresponding to the DL data channel (PUCCH #3) are overlapped over at least one symbol in the time domain, the UE may transmit the HARQ ACK corresponding to the DL data channel on PUCCH #1 along with the SR information (hereinafter SR1) corresponding to the first logical channel (i.e., both the SR1 and the HARQ ACK corresponding to the DL data channel are simultaneously transmitted to the BS on PUCCH #1).

In this case, if PUCCH #1 1010 and PUCCH #3 1030 differ in PUCCH length (or number of PUCCH symbols, N_PUCCH_symb), the UE may generate the HARQ ACK corresponding to the DL data channel based on the configuration information of PUCCH #1 and transmit the HARQ ACK on the corresponding frequency and time resources (i.e., PUCCH #1 1010). The UE may generate a signal carrying the HARQ ACK information using the configuration information about PUCCH #1 1010 with the exception of the bit information to be transmitted on PUCCH #1 1010 (e.g., b(0)=0 as the bit information being transmitted on PUCCH #1 1010 in the case of transmitting only the SR) and transmit the signal on the configured time and frequency resources (i.e., PUCCH #1 1010). That is, the UE may encode the bit information of the HARQ ACK corresponding to the received DL data in a binary phase shift keying (BPSK) or quadrature phase shift keying (QPSK) scheme to generate a signal containing the information to be transmitted, multiply the signal by a predetermined sequence (e.g., a Zadoff-Chu sequence), and spread the resulting signal with an orthogonal sequence value w_i(m) to generate the signal to be transmitted on PUCCH #1 1010.

That is, in comparison with the case of transmitting only the SR1 on PUCCH #1 1010, the UE may generate the HARQ ACK signal to be transmitted with the same configuration as that for the case of transmitting only the SR1, with the exception of the transmission information (i.e., HARQ ACK information), on the PUCCH #1 1010 and transmit the HARQ ACK signal on the time and frequency resources allocated in PUCCH #1 1010.

The configuration information about PUCCH #1 1010 may include all setting values necessary for generating the PUCCH, which include a PUCCH length (or number of PUCCH symbols defined as N_PUCCH_symb), a Zadoff-Chu sequence, a Zadoff-Chu sequence group number, sequence numbers in the group, a frequency hopping configuration, numbers of symbols for first and second hopping periods or spreading factors for the first and second hopping periods (defined as N_PUCCH_SF0 and N_PUCCH_SF1) when the frequency hopping is activated, and orthogonal sequence values therefor that are each configured for PUCCH #1 1010.

If PUCCH #1 1010 and PUCCH #3 1030 are identical in PUCCH length (or number of PUCCH symbols defined as N_PUCCH_symb), the UE may generate the HARQ ACK corresponding to the DL data channel based on the configuration information about PUCCH #3 1030 and transmit the configured time and frequency resources of PUCCH #1 1010. In more detail, the UE may encode the HARQ ACK corresponding to the received DL data in the BPSK or QPSK scheme to generate a signal, multiply the signal by a predetermined sequence (e.g., Zadoff-Chu sequence), and spread the multiplication result with an orthogonal sequence value w_i(m) to generate a spread signal. That is, the UE may generate the HARQ ACK signal to be transmitted with the same configuration value as that for the case of transmitting only the HARQ ACK on PUCCH #3 1030 and transmit the HARQ ACK signal on the time and frequency resources allocated in PUCCH #1.

Here, the configuration information about PUCCH #3 1030 may include a Zadoff-Chu sequence, a Zadoff-Chu sequence group number, sequence numbers in the group, a PUCCH length (or a number of PUCCH symbols defined as N_PUCCH_symb), a frequency hopping configuration, numbers of symbols for first and second hopping periods or spreading factors for the first and second hopping periods (defined as N_PUCCH_SF0 and N_PUCCH_SF1) when the frequency hopping is activated, and an orthogonal sequence value therefor that are each configured for the PUCCH. The configuration information may be received via higher layer signaling and/or DCI, and configuration values obtained through one or any combination of the higher layer signaling and DCI may be determined as the configuration information according to a rule indicated via the DCI. Thus, even when PUCCH #1 1010 and PUCCH #3 1030 are identical in PUCCH length (or number of PUCCH symbols defined as N_PUCCH_symb), the UE may generate the HARQ ACK corresponding to the DL data channel based on the configuration information about PUCCH #1 1010 and transmit the HARQ ACK on the time and frequency resources configured for the PUCCH #1 1010.

Figure 11:
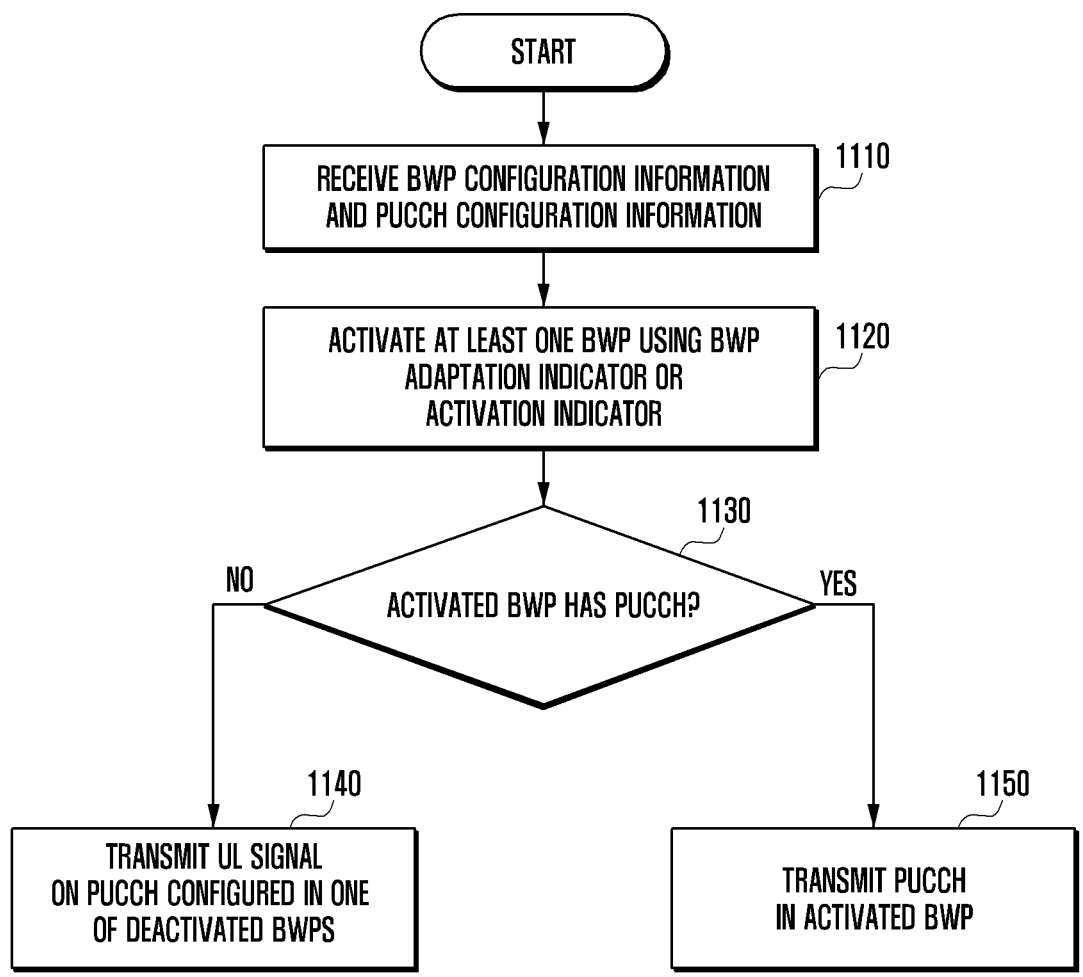
FIG. 11 is a flowchart illustrating a user equipment (UE) operation, according to an embodiment.

FIG. 11 is a flowchart illustrating a UE operation, according to an embodiment of the present disclosure. At step 1110, the UE receives BWP configuration information (e.g., information as shown in Table 1) and PUCCH configuration information about one or more BWPs as shown in Table 2 from the BS via higher layer signaling, a broadcast channel, or a DL data channel (e.g., a DL data channel scheduled via DCI scrambled with SI-RNTI) including system information. At step 1120, the UE activates at least one DL and UL BWP based on a BWP adaptation indicator or activation indicator included in the DCI transmitted via higher layer signaling or a DL control channel. If the DL and UL BWPs are correlated with each other, the UL BWP may be changed or activated according to the DL BWP adaptation indicator.

In the case where the UE should transmit a HARQ ACK corresponding to the DL data, the periodic CSI or SRS, or the SR to the BS, the UE determines at step 1130 whether the currently activated UL BWP has a configured PUCCH. If it is determined at 1130 that the currently activated UL BWP has the configured PUCCH, the UE transmits, at step 1150, a UL signal on the PUCCH that is, in the activated UL BWP, configured by the BS or indicated via the DCI transmitted by the BS. If it is determined at step 1130 that the currently activated UL BWP does not have a configured PUCCH, the UE may activate, at step 1140, a BWP having a configured PUCCH and transmit the UL signal on the PUCCH configured in the BWP.

Figure 12:
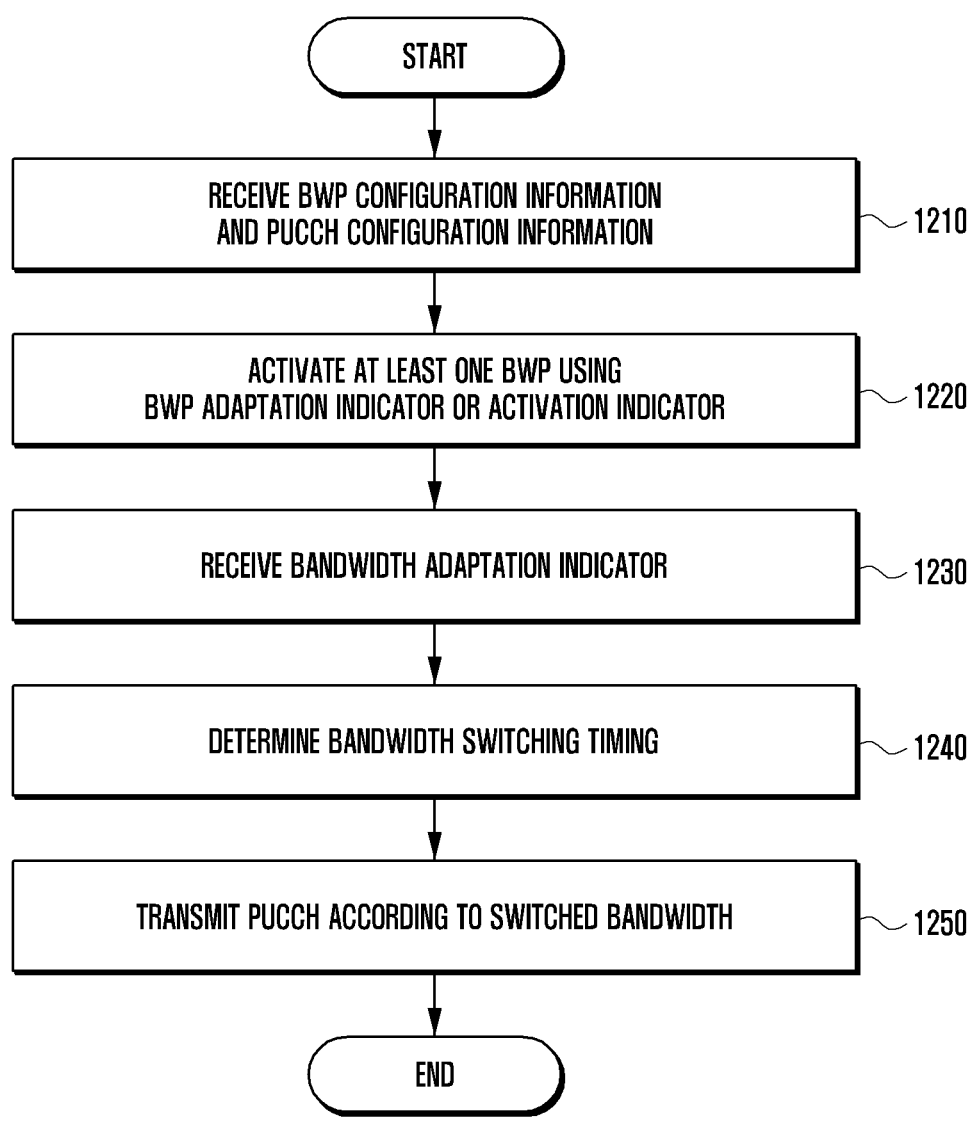
FIG. 12 is a flowchart illustrating a UE operation, according to an embodiment.

FIG. 12 is a flowchart illustrating a UE operation, according to an embodiment.

Referring to FIG. 12, at step 1210, the UE receives BWP configuration information (e.g., information as shown in Table 1) and PUCCH configuration information about one or more BWPs as shown in Table 2 from the BS via higher layer signaling, a broadcast channel, or a DL data channel (e.g., a DL data channel scheduled via DCI scrambled with SI-RNTI) including system information. At step 1220, the UE activates at least one DL and UL BWP based on a BWP adaptation indicator or activation indicator included in the DCI transmitted via higher layer signaling or a DL control channel. If the DL and UL BWPs are correlated with each other, the UL BWP may be changed or activated according to the DL BWP adaptation indicator.

If the UL BWP is changed or activated according to the DL BWP adaptation indicator in a correlated manner, it may be necessary to consider a case where the UE has to transmit the HARQ ACK corresponding to the DL data received from the BS, periodic CSI or SRS, or SR information. The UE may determine, at step 1240, the UL BWP switching or activation timing according to the aforementioned Method 1 or Method 2 and determine the PUCCH resources (or PUCCH format index or PUCCH format) configured in the activated BWP to transmit, at step 1250, the UL signal on the corresponding control channel resources.

The UE and BS, each composed of a transmitter, a receiver, and a processor for implementing the methods described above, are depicted in FIGS. 13 and 14, respectively.

Figure 13:
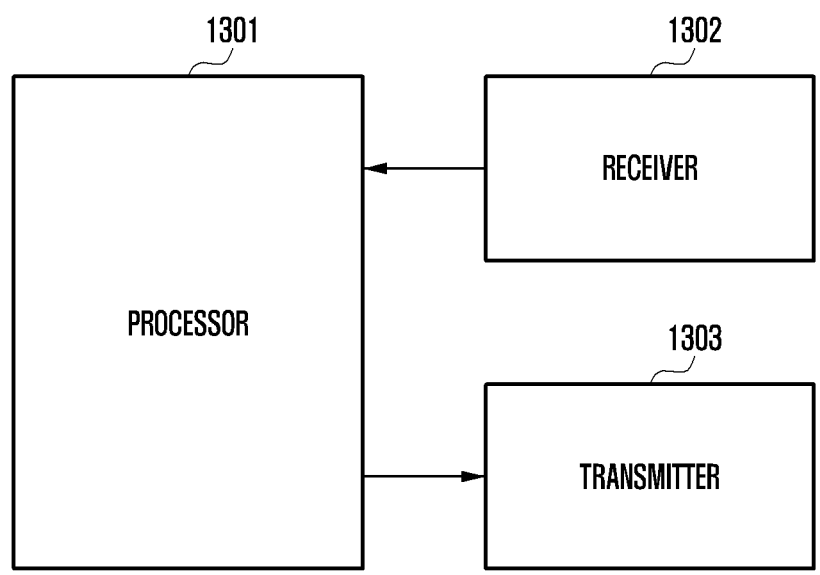
FIG. 13 is a block diagram illustrating a configuration of a UE, according to an embodiment.

FIG. 13 is a block diagram illustrating a configuration of a UE, according to an embodiment.

Referring to FIG. 13, the UE may include a processor 1301, a receiver 1302, and a transmitter 1303.

The processor 1301 may control overall operations of the UE. For example, the processor 1301 may control components differently to perform different operations based on the method that is performed (i.e., activating the UL bandwidth and determining PUSCH transmission operations according to the bandwidth configuration method, the bandwidth adaptation method, and the PUCCH transmission resource configuration method).

The receiver 1302 and the transmitter 1303 may be collectively referred to as a transceiver. The transceiver may transmit and receive signals to and from a BS. The signals may include control information and data. The transceiver may include an RF transmitter for frequency-up-converting and amplifying a signal to be transmitted and an RF receiver for low-noise-amplifying and frequency-down-converting a received signal. The transceiver may output the signal received over a radio channel to the processor 1301 and transmit the signal output from the processor 1301 over the radio channel.

Figure 14:
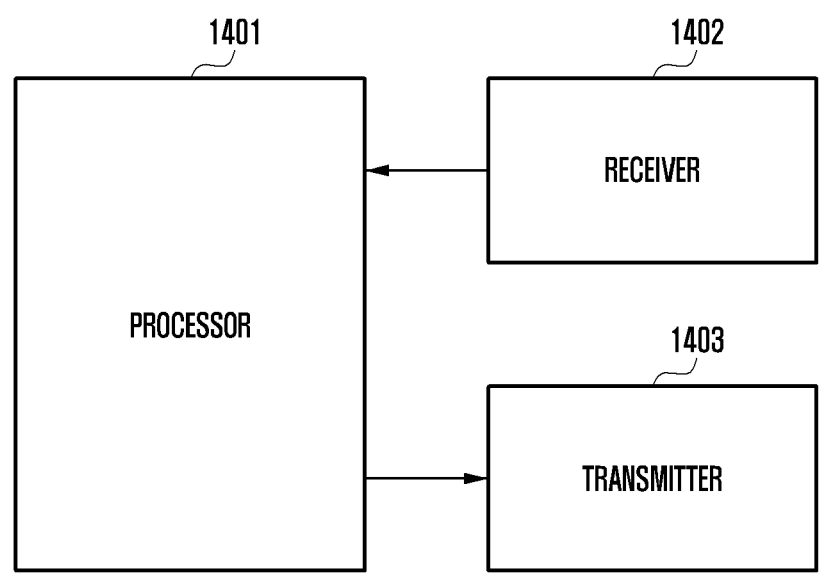
FIG. 14 is a block diagram illustrating a configuration of a base station (BS), according to an embodiment.

FIG. 14 is a block diagram illustrating a configuration of a BS, according to an embodiment.

Referring to FIG. 14, the BS may include a processor 1401, a receiver 1402, and a transmitter 1403.

The processor 1401 may control overall operations of the BS. For example, the processor 1401 may control components differently based on the method that is performed (i.e., the bandwidth configuration method, the bandwidth adaptation method, and the PUCCH transmission resource configuration method).

The receiver 1402 and the transmitter 1403 may be collectively referred to as a transceiver. The transceiver may transmit and receive signals to and from a terminal. The signals may include control information and data. The transceiver may include an RF transmitter for frequency-up-converting and amplifying a signal to be transmitted and an RF receiver for low-noise-amplifying and frequency-down-converting a received signal. The transceiver may output the signal received over a radio channel to the processor 1401 and transmit the signal output from the processor 1401 over the radio channel.

As described above, the UL resources configuration method and apparatus of the present disclosure are advantageous in terms of facilitating the operation of a 5G system by making it possible to flexibly configure UL control and data channel transmission resources.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method for transmitting uplink control information in a wireless communication system, the method comprising:
    receiving configuration information on a plurality of bandwidth parts (BWPs) via higher layer signaling from a base station, a configuration on one or more uplink control channel resource for each of the plurality of BWPs being included in the configuration information on the plurality of BWPs;
    receiving downlink control information and downlink data on a first BWP from the base station;
    receiving BWP adaptation information which indicates a change of an active BWP from the first BWP to a second BWP from the base station;
    identifying an uplink control channel resource for transmitting acknowledgement information in response to the downlink data based on the downlink control information, the BWP adaptation information, and the configuration on one or more uplink control channel resources for each of the plurality of BWPs; and
    transmitting the acknowledgement information on the identified uplink control channel resource to the base station,
    wherein the uplink control channel resource is identified based on an active BWP of acknowledgement information transmission timing.

2. The method of claim 1, wherein the uplink control channel resource is identified based on a modulo operation using a number of at least one uplink control channel resource of the active BWP of acknowledgement information transmission timing and an uplink control channel resource index indicated by the downlink control information.

3. The method of claim 1, wherein, in case that the active BWP of the acknowledgement information transmission timing is the second BWP, the uplink control channel resource is identified based on configuration on one or more uplink control channel resources for the second BWP.

4. A method for receiving uplink control information in a wireless communication system, the method comprising:
    transmitting configuration information on a plurality of bandwidth parts (BWPs) via higher layer signaling to a terminal, a configuration on one or more uplink control channel resource for each of the plurality of BWPs being included in the configuration information on the plurality of BWPs;
    transmitting downlink control information and downlink data on a first BWP to the terminal;
    transmitting BWP adaptation information which indicates a change of an active BWP from the first BWP to a second BWP to the terminal;
    receiving acknowledgement information in response to the downlink data on an uplink control channel resource from the terminal,
    wherein the uplink control channel resource depends on the downlink control information, the BWP adaptation information, the configuration on one or more uplink control channel resources for each of the plurality of BWPs, and an active BWP of acknowledgement information reception timing.

5. The method of claim 4, wherein the uplink control channel resource is based on a modulo operation using a number of at least one uplink control channel resource of the active BWP of acknowledgement information reception timing and an uplink control channel resource index indicated by the downlink control information.

6. The method of claim 4, wherein, in case that the active BWP of the acknowledgement information transmission timing is the second BWP, the uplink control channel resource is based on configuration on one or more uplink control channel resources for the second BWP.

7. A terminal for transmitting uplink control information in a wireless communication system, the terminal comprising:
    a transceiver; and
    a controller configured to:
    receive, from a base station via the transceiver, configuration information on a plurality of bandwidth parts (BWPs) via higher layer signaling, a configuration on one or more uplink control channel resource for each of the plurality of BWPs being included in the configuration information on the plurality of BWPs,
    receive, from the base station, downlink control information and downlink data on a first BWP,
    receive, from the base station, BWP adaptation information which indicates a change of an active BWP from the first BWP to a second BWP, identify an uplink control channel resource for transmitting acknowledgement information in response to the downlink data based on the downlink control information, the BWP adaptation information, and the configuration on one or more uplink control channel resources for each of the plurality of BWPs, and transmit to the base station, the acknowledgement information on the identified uplink control channel resource, wherein the uplink control channel resource is identified based on an active BWP of acknowledgement information transmission timing.

8. The terminal of claim 7, wherein the uplink control channel resource is identified based on a modulo operation using a number of at least one uplink control channel resource of the active BWP of acknowledgement information transmission timing and an uplink control channel resource index indicated by the downlink control information.

9. The terminal of claim 7, wherein, in case that the active BWP of the acknowledgement information transmission timing is the second BWP, the uplink control channel resource is identified based on configuration on one or more uplink control channel resources for the second BWP.

10. A base station for receiving uplink control information in a wireless communication system, the base station comprising:

a transceiver; and a controller and configured to:

transmit, to a terminal via the transceiver, configuration information on a plurality of bandwidth parts (BWPs) via higher layer signaling, a configuration on one or more uplink control channel resource for each of the plurality of BWPs being included in the configuration information on the plurality of BWPs, transmit, to the terminal, downlink control information and downlink data on a first BWP, transmit, to the terminal, BWP adaptation information which indicates a change of an active BWP from the first BWP to a second BWP, and receive, from the terminal, acknowledgement information in response to the downlink data on an uplink control channel resource, wherein the uplink control channel resource depends on the downlink control information, the BWP adaptation information, the configuration on one or more uplink control channel resources for each of the plurality of BWPs, and an active BWP of acknowledgement information reception timing.

11. The base station of claim 10, wherein the uplink control channel resource is based on a modulo operation using a number of at least one uplink control channel resource indices of the active BWP of acknowledgement information reception timing and an uplink control channel resource index indicated by the downlink control information.

12. The base station of claim 10, wherein, in case that the active BWP of the acknowledgement information transmission timing is the second BWP, the uplink control channel resource is based on configuration on one or more uplink control channel resources for the second BWP.

* * * * *